United States Patent
Wang et al.

(10) Patent No.: US 12,202,616 B2
(45) Date of Patent: Jan. 21, 2025

(54) RELIGHT OF A PROPULSION SYSTEM WITH A FUEL CELL

(71) Applicant: General Electric Company, Schenectady, NY (US)

(72) Inventors: Honggang Wang, Clifton Park, NY (US); Richard L. Hart, Broadalbin, NY (US); Michael Anthony Benjamin, Cincinnati, OH (US); Seung-Hyuck Hong, Clifton Park, NY (US)

(73) Assignee: General Electric Company, Evendale, OH (US)

( * ) Notice: Subject to any disclaimer, the term of this patent is extended or adjusted under 35 U.S.C. 154(b) by 316 days.

(21) Appl. No.: 17/518,903

(22) Filed: Nov. 4, 2021

(65) Prior Publication Data

US 2023/0138892 A1     May 4, 2023

(51) Int. Cl.
*B64D 31/06*       (2024.01)
*B60L 50/70*       (2019.01)
(Continued)

(52) U.S. Cl.
CPC .............. *B64D 31/06* (2013.01); *B60L 50/70* (2019.02); *B60L 58/34* (2019.02); *B64D 27/10* (2013.01);
(Continued)

(58) Field of Classification Search
CPC ...... B64D 27/355; B64D 31/06; B64D 27/24; B64D 2041/005; B64D 31/02;
(Continued)

(56) References Cited

U.S. PATENT DOCUMENTS

| | | |
|---|---|---|
| 3,658,279 A | 4/1972 | Robertson |
| 3,805,517 A | 4/1974 | Sewell et al. |

(Continued)

FOREIGN PATENT DOCUMENTS

| | | |
|---|---|---|
| CN | 106976405 A | 7/2017 |
| DE | 102005012230 A1 | 10/2005 |

(Continued)

OTHER PUBLICATIONS

Easa, Turbine Engine Relighting in Flight, 2015, European Aviation Safety Agency, CM-PIFS-010 Issue 01, All [Copy Provided By Applicant] (Year: 2015).*

(Continued)

*Primary Examiner* — Jason H Duger
(74) *Attorney, Agent, or Firm* — Dority & Manning, P.A.

(57) ABSTRACT

A propulsion system including: a fuel cell assembly having a fuel cell defining an outlet positioned to remove output products from the fuel cell and a fuel cell assembly operating condition; a turbomachine comprising a compressor section, a combustion section, and a turbine section arranged in serial flow order, the combustion section configured to receive a flow of aviation fuel from an aircraft fuel supply and further configured to receive the output products from the fuel cell; and a controller comprising memory and one or more processors, the memory storing instructions that when executed by the one or more processors cause the propulsion system to perform operations including receiving data indicative of a mid-flight flameout within the combustion section; modifying the fuel cell assembly operating condition in response to receiving data indicative of the mid-flight flameout within the combustion section; and initiating a relight of the combustion section.

16 Claims, 8 Drawing Sheets

(51) Int. Cl.
- *B60L 58/34* (2019.01)
- *B64D 27/10* (2006.01)
- *B64D 27/24* (2024.01)
- *F02C 7/262* (2006.01)
- *H01M 8/04664* (2016.01)
- *H01M 8/04701* (2016.01)
- *H01M 8/04746* (2016.01)
- *H01M 8/04858* (2016.01)
- *H01M 8/0612* (2016.01)

(52) U.S. Cl.
CPC ............ *B64D 27/24* (2013.01); *F02C 7/262* (2013.01); *H01M 8/04686* (2013.01); *H01M 8/04708* (2013.01); *H01M 8/04716* (2013.01); *H01M 8/04761* (2013.01); *H01M 8/0494* (2013.01); *H01M 8/0618* (2013.01); *B60L 2200/10* (2013.01); *F05D 2220/323* (2013.01); *H01M 2250/20* (2013.01)

(58) Field of Classification Search
CPC ...... B60L 50/70; B60L 58/34; B60L 2200/10; B60L 50/16; B60L 50/75; B60L 2240/445; H01M 8/04686; H01M 8/04708; H01M 8/04716; H01M 8/04761; H01M 8/0494; H01M 8/0618; H01M 2250/20; H01M 8/04738; H01M 8/04776; H01M 8/04805; F02C 9/00
See application file for complete search history.

(56) References Cited

U.S. PATENT DOCUMENTS

| | | |
|---|---|---|
| 4,684,081 A | 8/1987 | Cronin |
| 5,227,256 A | 7/1993 | Marianowski et al. |
| 5,581,995 A | 12/1996 | Lucenko et al. |
| 5,858,314 A | 1/1999 | Hsu et al. |
| 5,968,680 A | 10/1999 | Wolfe et al. |
| 6,183,703 B1 | 2/2001 | Hsu et al. |
| 6,296,957 B1 | 10/2001 | Graage |
| 6,348,278 B1 | 2/2002 | LaPierre et al. |
| 6,630,264 B2 | 10/2003 | Haltiner, Jr. et al. |
| 6,641,084 B1 | 11/2003 | Huber et al. |
| 6,834,831 B2 | 12/2004 | Daggett |
| 7,279,243 B2 | 10/2007 | Haltiner, Jr. et al. |
| 7,285,350 B2 | 10/2007 | Keefer et al. |
| 7,380,749 B2 | 6/2008 | Fucke et al. |
| 7,456,517 B2 | 11/2008 | Campbell et al. |
| 7,470,477 B2 | 12/2008 | Zizelman et al. |
| 7,513,119 B2 | 4/2009 | Zielinski et al. |
| 7,578,136 B2 | 8/2009 | Derouineau et al. |
| 7,659,021 B2 | 2/2010 | Horiuchi et al. |
| 7,709,118 B2 | 5/2010 | Lundberg |
| 7,743,499 B2 | 6/2010 | Pettit et al. |
| 7,781,115 B2 | 8/2010 | Lundberg |
| 7,854,582 B2 | 12/2010 | Ullyott |
| 7,926,287 B2 | 4/2011 | Ullyott et al. |
| 7,966,801 B2 | 6/2011 | Umeh et al. |
| 7,966,830 B2 | 6/2011 | Daggett |
| 8,141,360 B1 | 3/2012 | Huber |
| 8,232,670 B2 | 7/2012 | Breit et al. |
| 8,268,510 B2 | 9/2012 | Rock et al. |
| 8,288,060 B2 | 10/2012 | Bae et al. |
| 8,309,270 B2 | 11/2012 | Finnerty et al. |
| 8,373,381 B2 | 2/2013 | Raiser et al. |
| 8,394,552 B2 | 3/2013 | Gummalla et al. |
| 8,524,412 B2 | 9/2013 | Rock et al. |
| 8,722,270 B2 | 5/2014 | Pastula et al. |
| 8,727,270 B2 | 5/2014 | Burns et al. |
| 8,732,532 B2 | 5/2014 | Higeta |
| 8,820,677 B2 | 9/2014 | Rajashekara et al. |
| 8,846,255 B2 | 9/2014 | Dineen |
| 8,875,519 B2 | 11/2014 | Dooley |
| 8,950,703 B2 | 2/2015 | Bayliss et al. |
| 9,005,847 B2 | 4/2015 | Rock et al. |
| 9,028,990 B2 | 5/2015 | Gans et al. |
| 9,054,385 B2 | 6/2015 | Jones et al. |
| 9,059,440 B2 | 6/2015 | Hotto |
| 9,068,748 B2 | 6/2015 | Hoke |
| 9,118,054 B2 | 8/2015 | Gummalla et al. |
| 9,347,379 B2 | 5/2016 | Dooley |
| 9,359,956 B2 | 6/2016 | Dooley |
| 9,435,230 B2 | 9/2016 | Kim et al. |
| 9,444,108 B2 | 9/2016 | Brousseau |
| 9,464,573 B2 | 10/2016 | Remy et al. |
| 9,541,001 B2 | 1/2017 | Steinwandel et al. |
| 9,604,730 B2 | 3/2017 | Hagh et al. |
| 9,617,006 B2 | 4/2017 | Brugger et al. |
| 9,666,888 B2 | 5/2017 | Nagai et al. |
| 9,777,638 B2 | 10/2017 | Freidl |
| 9,897,041 B2 | 2/2018 | Hoffjann et al. |
| 9,966,619 B2 | 5/2018 | Libis et al. |
| 10,008,726 B2 | 6/2018 | Leah et al. |
| 10,035,607 B2 | 7/2018 | Wangemann et al. |
| 10,069,150 B2 | 9/2018 | Mata et al. |
| 10,224,556 B2 | 3/2019 | Lents et al. |
| 10,318,003 B2 | 6/2019 | Gannon et al. |
| 10,443,504 B2 | 10/2019 | Dalal |
| 10,446,858 B2 | 10/2019 | Palumbo et al. |
| 10,487,839 B2 | 11/2019 | Kupiszewski et al. |
| 10,622,653 B2 | 4/2020 | Whyatt et al. |
| 10,641,179 B2 | 5/2020 | Hayama et al. |
| 10,644,331 B2 | 5/2020 | Stoia et al. |
| 10,671,092 B2 | 6/2020 | DiRusso et al. |
| 10,676,208 B2 | 6/2020 | Wangemann et al. |
| 10,724,432 B2 | 7/2020 | Shapiro et al. |
| 10,737,802 B2 | 8/2020 | Krug et al. |
| 10,762,726 B2 | 9/2020 | Gansler et al. |
| 10,766,629 B2 | 9/2020 | Mercier-Calvairac et al. |
| 10,774,741 B2 | 9/2020 | Sennoun |
| 10,814,992 B2 | 10/2020 | Halsey et al. |
| 10,913,543 B2 | 2/2021 | Bailey et al. |
| 10,919,635 B2 | 2/2021 | Edgar et al. |
| 10,967,984 B2 | 4/2021 | Willford et al. |
| 10,978,723 B2 | 4/2021 | Lo et al. |
| 2002/0163819 A1 | 11/2002 | Treece |
| 2004/0081871 A1 | 4/2004 | Kearl et al. |
| 2004/0150366 A1 | 8/2004 | Ferrall et al. |
| 2006/0010866 A1 | 1/2006 | Rehg et al. |
| 2007/0154745 A1* | 7/2007 | Penev .............. H01M 8/04835 429/444 |
| 2007/0245709 A1* | 10/2007 | Dooley ................. F02C 7/262 60/767 |
| 2008/0155984 A1 | 7/2008 | Liu et al. |
| 2010/0133475 A1 | 6/2010 | Kobayashi et al. |
| 2010/0159303 A1 | 6/2010 | Rock et al. |
| 2011/0071707 A1 | 3/2011 | Crumm et al. |
| 2012/0161512 A1 | 6/2012 | Metzler et al. |
| 2012/0301814 A1 | 11/2012 | Beasley et al. |
| 2013/0099560 A1 | 4/2013 | Shipley et al. |
| 2013/0280634 A1 | 10/2013 | Park et al. |
| 2014/0023945 A1 | 1/2014 | Epstein et al. |
| 2014/0325991 A1 | 11/2014 | Liew et al. |
| 2015/0030947 A1 | 1/2015 | Saunders et al. |
| 2015/0151844 A1 | 6/2015 | Anton et al. |
| 2016/0260991 A1 | 9/2016 | Shapiro et al. |
| 2017/0070088 A1 | 3/2017 | Bernsten et al. |
| 2018/0003072 A1 | 1/2018 | Lents et al. |
| 2018/0141675 A1 | 5/2018 | Halsey et al. |
| 2018/0166734 A1 | 6/2018 | Linde et al. |
| 2018/0319283 A1 | 11/2018 | Battin et al. |
| 2019/0121369 A1 | 4/2019 | DiRusso et al. |
| 2019/0136761 A1* | 5/2019 | Shapiro ............ H01M 8/04201 |
| 2019/0145273 A1 | 5/2019 | Frank et al. |
| 2019/0186379 A1* | 6/2019 | Lowery .................... F23R 3/16 |
| 2020/0014044 A1 | 1/2020 | Tichy et al. |
| 2020/0062414 A1 | 2/2020 | Hon et al. |
| 2020/0136163 A1 | 4/2020 | Holland et al. |
| 2020/0149479 A1 | 5/2020 | Des Roches-Dionne et al. |
| 2020/0194799 A1 | 6/2020 | Hart et al. |
| 2020/0313207 A1 | 10/2020 | Milcarek et al. |

(56) References Cited

U.S. PATENT DOCUMENTS

| | | |
|---|---|---|
| 2021/0003281 A1 | 1/2021 | Amble et al. |
| 2021/0075034 A1 | 3/2021 | Irie et al. |
| 2021/0115857 A1 | 4/2021 | Collopy |

FOREIGN PATENT DOCUMENTS

| | | |
|---|---|---|
| EP | 3805107 A1 * | 4/2021 |
| JP | 2009187756 A | 8/2009 |
| JP | 2011002308 A | 1/2011 |
| JP | 2018087501 A | 6/2018 |
| KR | 20090064853 A | 6/2009 |
| WO | WO2018108962 A1 | 6/2018 |
| WO | WO2020/011380 A1 | 1/2020 |

OTHER PUBLICATIONS

Babu D et al., Optimization of Pattern Factor of the Annular Gas Turbine Combustor for Better Turbine Life, IOSR Journal of Mechanical and Civil Engineering, pp. 30-35.

Cocker et al., 3D Printing Cuts Fuel Cell Component Costs, Energy and Environmental Science Article featured in Chemistry World, Jul. 3, 2014, 3 Pages. https://www.chemistryworld.com/news/3d-printing-cuts-fuel-cell-component-costs/7526.article.

Code of Federal Regulations, National Archives, Title 14, Chapter I, Subchapter C, Part 33, §33.75 Safety Analysis, 2007, refer to p. 25 of 50. https://www.ecfr.gov/cgi-bin/text-idx?SID=5ela000b517423bb51a8f713ca211b68&mc=true&node=pt14.1.33& rgn=div5#se14.1.33_175.

Honegger, Gas Turbine Combustion Modeling for a Parametric Emissions Monitoring System, Thesis Kansas State University College of Engineering, Manhattan Kansas, 2004, 97 Pages. https://core.ac.uk/download/pdf/5164453.pdf.

Krishnan, Recent Developments in Metal-Supported Solid Oxide Fuel Cells, Wires Energy and Environment, vol. 6, Issue 5, Mar. 30, 2017, 34 Pages. (Abstract Only) https://doi.org/10.002/wene.246.

Mark et al., Design and Analysis of Annular Combustion Chamber of a Low Bypass Turbofan Engine in a Jet Trainer Aircraft, Propulsion and Power Research, vol. 5, Issue 2, 2015, pp. 97-107.

Thorud, Dynamic Modelling and Characterisation of a Solid Oxide Fuel Cell Integrated in a Gas Turbine Cycle, Trondheim, NTNU, Oct. 2005, 278 Pages.

Turbine Engine Relighting in Flight, Certification Memorandum, CM-PIFS-010, European Aviation Safety Agency (EASA), Issue 1, Apr. 29, 2015, 6 Pages.

Whyatt et al., Electrical Generation for More-Electric Aircraft Using Solid Oxide Fuel Cells, No. PNNL-21382, Pacific Northwest National Lab (PNNL), Richland WA, 2012, 110 Pages. https://www.energy.gov/sites/prod/files/2014/03/f9/sofc_for_aircraft_pnnl_2012.pdf.

* cited by examiner

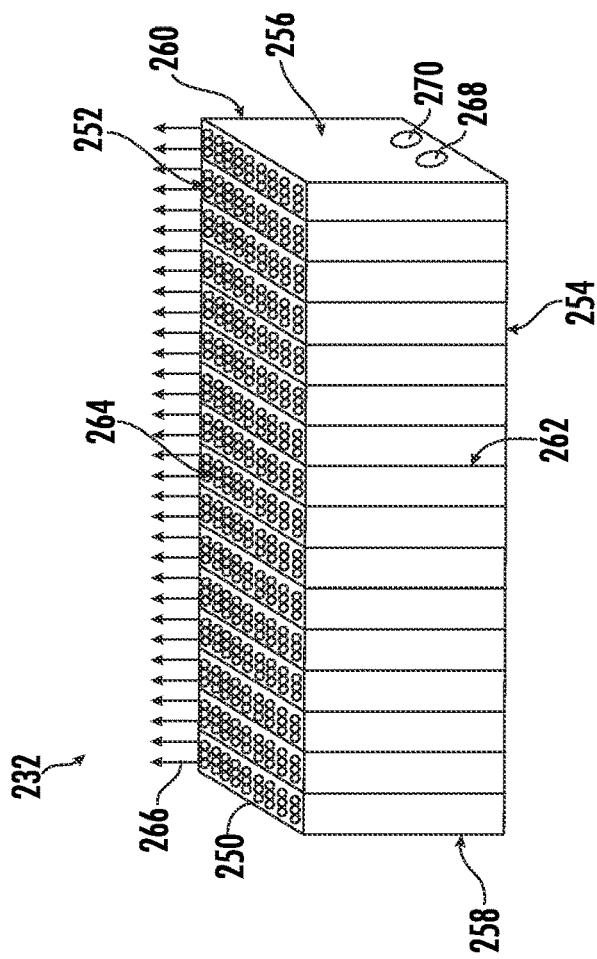
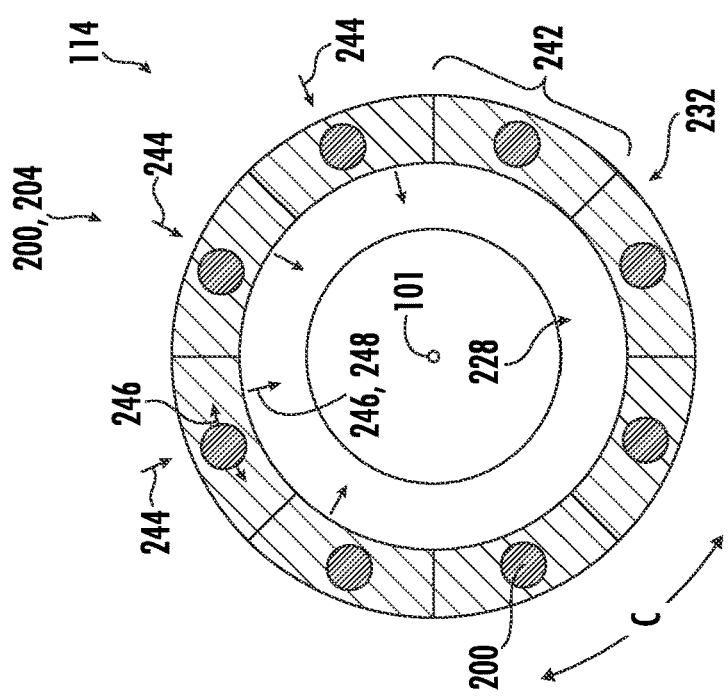

RELIGHT OF A PROPULSION SYSTEM WITH A FUEL CELL

FIELD

The present disclosure relates to a system and method for relighting a propulsion system for a gas turbine engine, the propulsion system including a fuel cell.

BACKGROUND

A gas turbine engine generally includes a turbomachine and a rotor assembly. Gas turbine engines, such as turbofan engines, may be used for aircraft propulsion. In the case of a turbofan engine, the turbomachine includes a compressor section, a combustion section, and a turbine section in serial flow order, and the rotor assembly is configured as a fan assembly.

During operation, air is compressed in the compressor and mixed with fuel and ignited in the combustion section for generating combustion gases which flow downstream through the turbine section. The turbine section extracts energy therefrom for rotating the compressor section and fan assembly to power the gas turbine engine and propel an aircraft incorporating such a gas turbine engine in flight.

A mid-flight engine flameout condition may occur during flight, whereby a flame in the combustion section is extinguished. For example, a mid-flight engine flameout condition may occur during a takeoff operation, a cruise operation, or a landing operation due to, e.g., bird ingestion, ice ingestion, engine malfunction, pilot error. etc. Re-starting or reigniting the engine following one or more of these events must be provided.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 3 is a schematic, axial view of the exemplary integrated fuel cell and combustor assembly of FIG. 2.

FIG. 4 is a schematic view of a fuel cell of a fuel cell assembly in accordance with an exemplary aspect of the present disclosure as may be incorporated into the exemplary integrated fuel cell and combustor assembly of FIG. 2.

DETAILED DESCRIPTION

Figure 1:
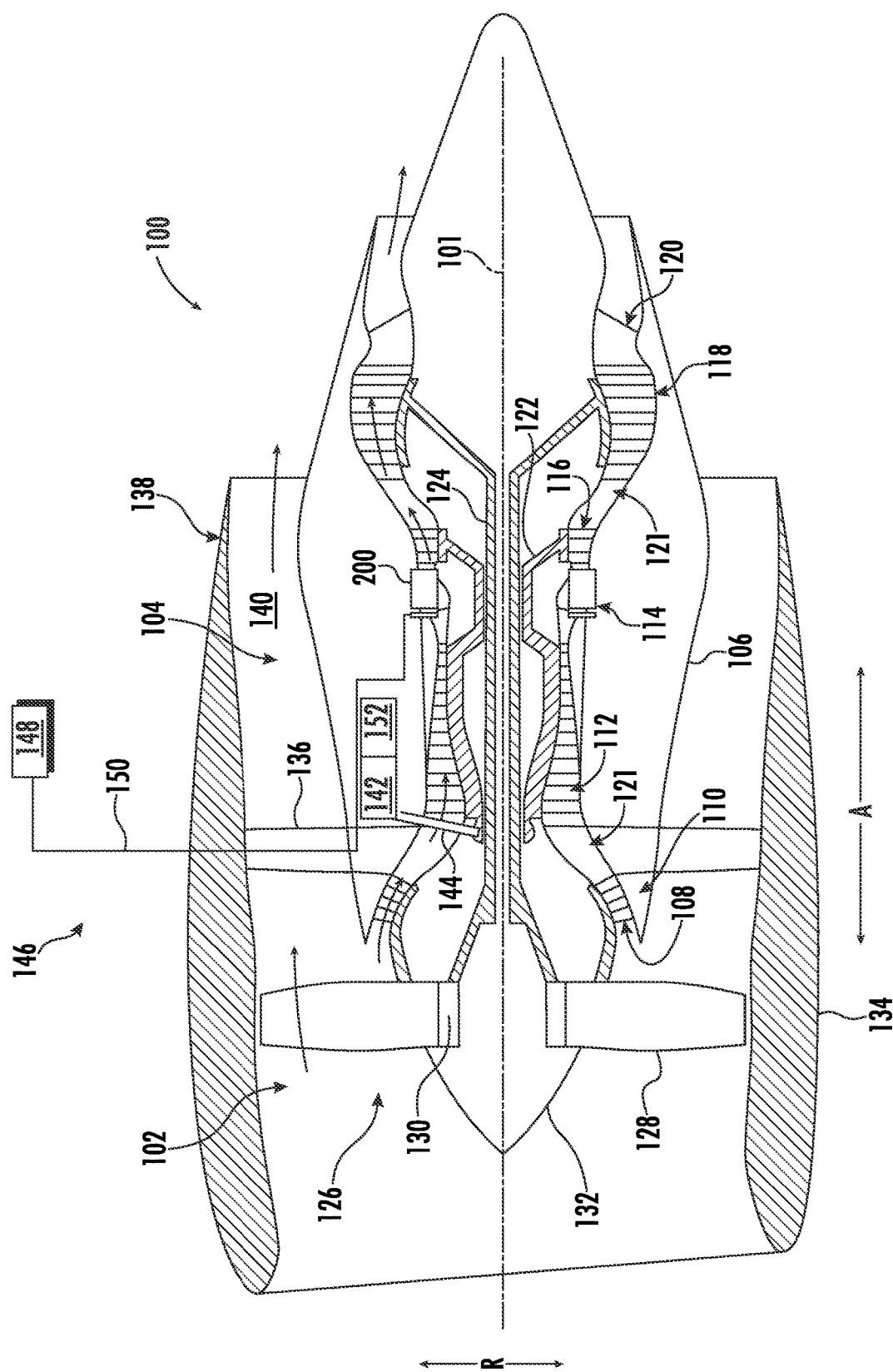
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" or "at least one of A, B, or C" refers to only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

A system and method are provided for operating a propulsion system for an aircraft. The propulsion system includes a fuel cell assembly comprising a fuel cell, the fuel cell defining an outlet positioned to remove output products from the fuel cell. The propulsion system further includes a turbomachine, the turbomachine including a combustion section configured to receive a flow of aviation fuel from an aircraft fuel supply of the aircraft and further configured to receive the output products from the fuel cell. The system and method are generally configured to receive data indicative of a mid-flight flameout within the combustion section. The data may be data indicative of a sudden drop in exhaust gas temperature, or any other suitable data. In response to receiving data indicative of the mid-flight flameout within the combustion section, the system and method are configured to modify a fuel cell assembly operating condition. The fuel cell assembly operating condition may be at least one of a fuel processing unit operating condition, an air processing unit operating condition, a fuel cell exhaust condition, or a fuel cell operating condition. The modification to the fuel cell assembly operating condition may generally result in a more favorable atmosphere within a combustion chamber of the combustion section for facilitating a relight of the combustion chamber, or in other conditions for facilitating a relight of the combustion chamber (e.g., reducing a drag on an HP spool of the gas turbine engine to facilitating quicker motoring of the HP spool by a starter motor). Following the modification of the fuel cell assembly operating condition, the system and method may initiate a relight of the combustion section.

A system and method of the present disclosure may generally result in a quicker and/or more probable relight of the combustion chamber during a flight operation of the engine by leveraging operational effects of a fuel cell assembly integrated into the combustor assembly. Such an increase in the speed and/or probability of the relighting of the combustion chamber during the flight operation is provided without requiring any, or only requiring minimal, additional structure and complication for the engine.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable vehicle.

For the embodiment depicted, the engine is configured as a high bypass turbofan engine 100. As shown in FIG. 1, the turbofan engine 100 defines an axial direction A (extending parallel to a centerline axis 101 provided for reference), a radial direction R, and a circumferential direction (extending about the axial direction A; not depicted in FIG. 1). In general, the turbofan engine 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the centerline axis 101 by the LP shaft 124. The disk 130 is covered by a rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

In such a manner, it will be appreciated that turbofan engine 100 generally includes a first stream (e.g., core air flowpath 121) and a second stream (e.g., bypass airflow passage 140) extending parallel to the first stream. In certain exemplary embodiments, the turbofan engine 100 may further define a third stream extending, e.g., from the LP compressor 110 to the bypass airflow passage 140 or to ambient. With such a configuration, the LP compressor 110 may generally include a first compressor stage configured as a ducted mid-fan and downstream compressor stages. An inlet to the third stream may be positioned between the first compressor stage and the downstream compressor stages.

Referring still to FIG. 1, the turbofan engine 100 additionally includes an accessory gearbox 142 and a fuel delivery system 146. For the embodiment shown, the accessory gearbox 142 is located within the cowling/outer casing 106 of the turbomachine 104. Additionally, it will be appreciated that for the embodiment depicted schematically in FIG. 1, the accessory gearbox 142 is mechanically coupled to, and rotatable with, one or more shafts or spools of the turbomachine 104. For example, in the exemplary embodiment depicted, the accessory gearbox 142 is mechanically coupled to, and rotatable with, the HP shaft 122 through a suitable geartrain 144. The accessory gearbox 142 may provide power to one or more suitable accessory systems of the turbofan engine 100 during at least certain operations, and may further provide power back to the turbofan engine 100 during other operations. For example, the accessory gearbox 142 is, for the embodiment depicted, coupled to a starter motor/generator 152. The starter motor/generator may be configured to extract power from the accessory gearbox 142 and turbofan engine 100 during certain operation to generate electrical power, and may provide power back to the accessory gearbox 142 and turbofan engine 100 (e.g., to the HP shaft 122) during other operations to add mechanical work back to the turbofan engine 100 (e.g., for starting the turbofan engine 100).

Moreover, the fuel delivery system 146 generally includes a fuel source 148, such as a fuel tank, and one or more fuel delivery lines 150. The one or more fuel delivery lines 150 provide a fuel flow through the fuel delivery system 146 to the combustion section 114 of the turbomachine 104 of the turbofan engine 100. As will be discussed in more detail below, the combustion section 114 includes an integrated fuel cell and combustor assembly 200. The one or more fuel delivery lines 150, for the embodiment depicted, provide a flow of fuel to the integrated fuel cell and combustor assembly 200.

It will be appreciated, however, that the exemplary turbofan engine 100 depicted in FIG. 1 is provided by way of example only. In other exemplary embodiments, any other suitable gas turbine engine may be utilized with aspects of the present disclosure. For example, in other embodiments, the turbofan engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine, in other embodiments, a gas turbine engine of the present disclosure may be a geared gas turbine engine (i.e., including a gearbox between the fan 126 and a shaft driving the fan, such as the LP shaft 124), may be a variable pitch gas turbine engine (i.e., including a fan 126 having a plurality of fan blades 128 rotatable about their respective pitch axes), etc. Moreover, although the exemplary turbofan engine 100 includes a ducted fan 126, in other exemplary aspects, the turbofan engine 100 may include an unducted fan 126 (or open rotor fan), without the nacelle 134. Further, although not depicted herein, in other embodiments the gas turbine engine may be any other suitable type of gas turbine engine, such as a nautical gas turbine engine.

Figure 2:
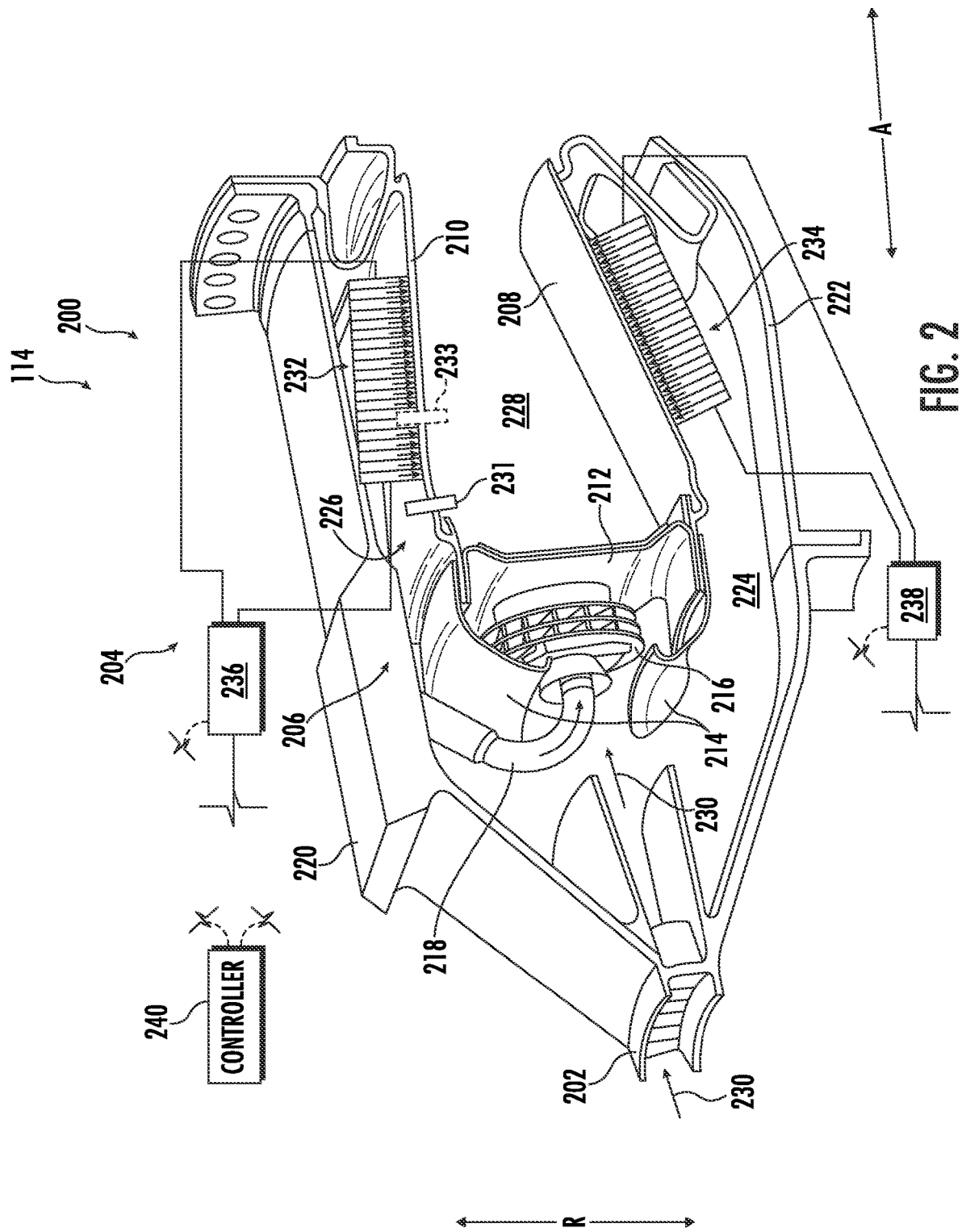
FIG. 2 is a perspective view of an integrated fuel cell and combustor assembly in accordance with the present disclosure.

Referring now to FIG. 2, illustrated schematically is a portion of the combustion section 114 including a portion of the integrated fuel cell and combustor assembly 200 used in the gas turbine engine 100 of FIG. 1 (described as a turbofan engine 100 above with respect to FIG. 1), according to an embodiment of the present disclosure.

As will be appreciated, the combustion section 114 includes a compressor diffuser nozzle 202 and extends between an upstream end and a downstream end generally along the axial direction A. The combustion section 114 is fluidly coupled to the compressor section at the upstream end via the compressor diffuser nozzle 202 and to the turbine section at the downstream end.

The integrated fuel cell and combustor assembly 200 generally includes a fuel cell assembly 204 (only partially depicted in FIG. 2; see also FIGS. 3 through 5) and a combustor 206. The combustor 206 includes an inner liner 208, an outer liner 210, a dome assembly 212, a cowl assembly 214, a swirler assembly 216, and a fuel flowline 218. The combustion section 114 generally includes an outer casing 220 outward of the combustor 206 along the radial direction R to enclose the combustor 206 and an inner casing 222 inward of the combustor 206 along the radial direction R. The inner casing 222 and inner liner 208 define an inner passageway 224 therebetween, and the outer casing 220 and outer liner 210 define an outer passageway 226 therebetween. The inner casing 222, the outer casing 220, and the dome assembly 212 together define at least in part a combustion chamber 228 of the combustor 206.

The dome assembly 212 is disposed proximate the upstream end of the combustion section 114 (i.e., closer to the upstream end than the downstream end) and includes an opening (not labeled) for receiving and holding the swirler assembly 216. The swirler assembly 216 also includes an opening for receiving and holding the fuel flowline 218. The fuel flowline 218 is further coupled to the fuel source 148 (see FIG. 1) disposed outside the outer casing 220 along the radial direction R and configured to receive the fuel from the fuel source 148. In such a manner, the fuel flowline 218 may be fluidly coupled to the one or more fuel delivery lines 150 described above with reference to FIG. 1.

The swirler assembly 216 can include a plurality of swirlers (not shown) configured to swirl the compressed fluid before injecting it into the combustion chamber 228 to generate combustion gas. The cowl assembly 214, in the embodiment depicted, is configured to hold the inner liner 208, the outer liner 210, the swirler assembly 216, and the dome assembly 212 together.

During operation, the compressor diffuser nozzle 202 is configured to direct a compressed fluid 230 from the compressor section to the combustor 206, where the compressed fluid 230 is configured to be mixed with fuel within the swirler assembly 216 and combusted within the combustion chamber 228 to generate combustion gasses. The combustion gasses are provided to the turbine section to drive one or more turbines of the turbine section (e.g., the high pressure turbine 116 and low pressure turbine 118).

During operation of the gas turbine engine 100 including the integrated fuel cell and combustor assembly 200, a flame within the combustion chamber 228 is maintained by a continuous flow of fuel and air. In order to provide for an ignition of the fuel and air, e.g., during a startup of the gas turbine engine 100, the integrated fuel cell and combustor assembly 200 further includes an ignitor 231. The ignitor 231 may provide a spark or initial flame to ignite a fuel and air mixture within the combustion chamber 228. In certain exemplary embodiments, the integrated fuel cell and combustor assembly 200 may additionally include a dedicated fuel cell ignitor 233 (depicted in phantom). In particular, for the embodiment of FIG. 2, the dedicated fuel cell ignitor 233 is positioned downstream of at least a portion of a fuel cell, and in particular of a fuel cell stack (described below). In such a manner, the dedicated fuel cell ignitor 233 may more effectively combust output products of the fuel cell.

As mentioned above and depicted schematically in FIG. 2, the integrated fuel cell and combustor assembly 200 further includes the fuel cell assembly 204. The exemplary fuel cell assembly 204 depicted includes a first fuel cell stack 232 and a second fuel cell stack 234. More specifically, the first fuel cell stack 232 is configured with the outer liner 210 and the second fuel cell stack 234 is configured with the inner liner 208. More specifically, still, the first fuel cell stack 232 is integrated with the outer liner 210 and the second fuel cell stack 234 is integrated with the inner liner 208. Operation of the fuel cell assembly 204, and more specifically of a fuel cell stack (e.g., first fuel cell stack 232 or second fuel cell stack 234) of the fuel cell assembly 204 will be described in more detail below.

For the embodiment depicted, the fuel cell assembly 204 is configured as a solid oxide fuel cell ("SOFC") assembly, with the first fuel cell stack 232 configured as a first SOFC fuel cell stack and the second fuel cell stack 234 configured as a second SOFC fuel cell stack (each having a plurality of SOFC's). As will be appreciated, a SOFC is generally an electrochemical conversion device that produces electricity directly from oxidizing a fuel. In generally, fuel cell assemblies, and in particular fuel cells, are characterized by an electrolyte material utilized. The SOFC's of the present disclosure may generally include a solid oxide or ceramic electrolyte. This class of fuel cells generally exhibit high combined heat and power efficiency, long-term stability, fuel flexibility, and low emissions.

Moreover, the exemplary fuel cell assembly 204 further includes a first power converter 236 and a second power converter 238. The first fuel cell stack 232 is in electrical communication with the first power converter 236 by a first plurality of power supply cables (not labeled), and the second fuel cell stack 234 is in electrical communication with the second power converter 238 by a second plurality of power supply cables (not labeled).

The first power converter 236 controls the electrical current drawn from the corresponding first fuel cell stack 232 and may convert the electrical power from a direct current ("DC") power to either DC power at another voltage level or alternating current ("AC") power. Similarly, the second power converter 238 controls the electrical current drawn from the second fuel cell stack 234 and may convert the electrical power from a DC power to either DC power at another voltage level or AC power. The first power converter 236, the second power converter 238, or both may be electrically coupled to an electric bus (such as the electric bus 326 described below).

The integrated fuel cell and combustor assembly 200 further includes a fuel cell controller 240 that is in operable communication with both of the first power converter 236 and second power converter 238 to, e.g., send and receive communications and signals therebetween. For example, the fuel cell controller 240 may send current or power setpoint signals to the first power converter 236 and second power converter 238, and may receive, e.g., a voltage or current feedback signal from the first power converter 236 and second power converter 238. The fuel cell controller 240 may be configured in the same manner as the controller 240 described below with reference to FIG. 5.

It will be appreciated that in at least certain exemplary embodiments the first fuel cell stack 232, the second fuel cell stack 234, or both may extend substantially 360 degrees in a circumferential direction C of the gas turbine engine (i.e., a direction extending about the centerline axis 101 of the gas turbine engine 100). For example, referring now to FIG. 3, a simplified cross-sectional view of the integrated fuel cell and combustor assembly 200 is depicted according to an exemplary embodiment of the present disclosure. Although only the first fuel cell stack 232 is depicted in FIG. 3 for simplicity, the second fuel cell stack 234 may be configured in a similar manner.

As shown, the first fuel cell stack 232 extends around the combustion chamber 228 in the circumferential direction C, completely encircling the combustion chamber 228 around the centerline axis 101 in the embodiment shown. More specifically, the first fuel cell stack 232 includes a plurality of fuel cells 242 arranged along the circumferential direction C. The fuel cells 242 that are visible in FIG. 3 can be a single ring of fuel cells 242, with fuel cells 242 stacked together along the axial direction A (see FIG. 2) to form the first fuel cell stack 232. In another instance, multiple additional rings of fuel cells 242 can be placed on top of each other to form the first fuel cell stack 232 that is elongated along the centerline axis 101.

As will be explained in more detail, below, with reference to FIG. 5, the fuel cells 242 in the first fuel cell stack 232 are positioned to receive discharged air 244 from, e.g., the compressor section and fuel 246 from the fuel delivery system 146. The fuel cells 242 generate electrical current using this air 244 and at least some of this fuel 246, and radially direct partially oxidized fuel 246 and unused portion of air 248 into the combustion chamber 228 toward the centerline axis 101. The integrated fuel cell and combustor assembly 200 combusts the partially oxidized fuel 246 and air 248 in the combustion chamber 228 into combustion gasses that are directed downstream into the turbine section to drive or assist with driving the one or more turbines therein.

Moreover, referring now to FIG. 4, a schematic illustration is provided as a perspective view of the first fuel cell stack 232 of the integrated fuel cell and combustor assembly 200 of FIG. 2. The second fuel cell stack 234 may be formed in a similar manner.

The first fuel cell stack 232 depicted includes a housing 250 having a combustion outlet side 252 and a side 254 that is opposite to the combustion outlet side 252, a fuel and air inlet side 256 and a side 258 that is opposite to the fuel and air inlet side 256, and sides 260, 262. The side 260, the side 258 and the side 254 are not visible in the perspective view of FIG. 4.

As will be appreciated, the first fuel cell stack 232 may include a plurality of fuel cells that are "stacked," e.g., side-by-side from one end of the first fuel cell stack 232 (e.g., fuel and air inlet side 256) to another end of the first fuel cell stack 232 (e.g., side 258). As such, it will further be appreciated that the combustion outlet side 252 includes a plurality of combustion outlets 264, each from a fuel cell of the first fuel cell stack 232. During operation, combustion gas 266 (also referred to herein as "output products") is directed from the combustion outlets 264 out of the housing 250. As described herein, the combustion gas 266 is generated using fuel and air that is not consumed by the fuel cells inside the housing 250 of the first fuel cell stack 232. The combustion gas 266 is provided to the combustion chamber 228 and burned during operation to generate combustion gasses used to generate thrust for the gas turbine engine 100 (and vehicle/aircraft incorporating the gas turbine engine 100).

The fuel and air inlet side 256 includes one or more fuel inlets 268 and one or more air inlets 270. Optionally, the one or more of the inlets 268, 270 can be on another side of the housing 250. Each of the one or more fuel inlets 268 is fluidly coupled with a source of fuel for the first fuel cell stack 232, such as one or more pressurized containers of a hydrogen-containing gas or a fuel processing unit as described further below. Each of the one or more air inlets 270 is fluidly coupled with a source of air for the fuel cells, such as air that is discharged from a compressor section and/or an air processing unit as is also described further below. The inlets 268, 270 separately receive the fuel and air from the external sources of fuel and air, and separately direct the fuel and air into the fuel cells.

In certain exemplary embodiments, the first fuel cell stack 232 of FIGS. 2 through 4 may be configured in a similar manner to one or more of the exemplary fuel cell systems (labeled 100) described in, e.g., U.S. Patent Application Publication No. 2020/0194799 A1, filed Dec. 17, 2018, that is incorporated by reference herein in its entirety. It will further be appreciated that the second fuel cell stack 234 of FIG. 2, may be configured in a similar manner as the first fuel cell stack 232, or alternatively may be configured in any other suitable manner.

Figure 5:
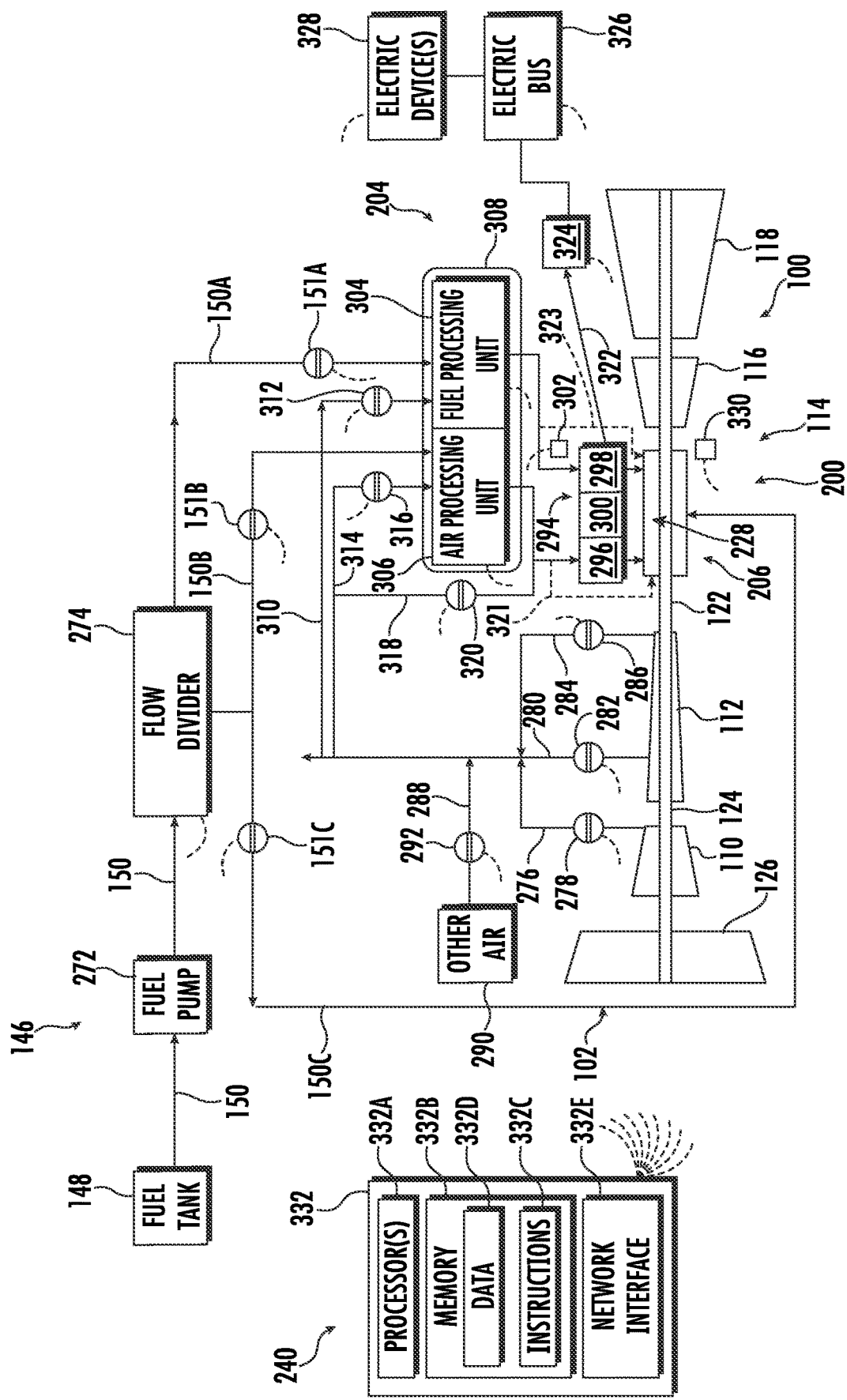
FIG. 5 is a schematic diagram of a gas turbine engine including an integrated fuel cell and combustor assembly in accordance with an exemplary aspect of the present disclosure.

Referring now to FIG. 5, operation of an integrated fuel cell and combustor assembly 200 in accordance with an exemplary embodiment of the present disclosure will be described. More specifically, FIG. 5 provides a schematic illustration of a gas turbine engine 100 and an integrated fuel cell and combustor assembly 200 according to an embodiment of the present disclosure. The gas turbine engine 100 and integrated fuel cell and combustor assembly 200 may, in certain exemplary embodiments, be configured in a similar manner as one or more of the exemplary embodiments of FIGS. 1 through 4.

Accordingly, it will be appreciated that the gas turbine engine 100 generally includes a fan section 102 having a fan 126, an LP compressor 110, an HP compressor 112, a combustion section 114, an HP turbine 116, and an LP turbine 118. The combustion section 114 generally includes the integrated fuel cell and combustor assembly 200 having a combustor 206 and a fuel cell assembly 204.

A propulsion system including the gas turbine engine 100 further includes a fuel delivery system 146. The fuel delivery system 146 generally includes a fuel source 148 and one or more fuel delivery lines 150. The fuel source 148 may include a supply of fuel (e.g., a hydrocarbon fuel, including, e.g., a carbon-neutral fuel or synthetic hydrocarbons) for the gas turbine engine 100. In addition, it will be appreciated that the fuel delivery system 146 also includes a fuel pump 272 and a flow divider 274, and the one or more fuel delivery lines 150 include a first fuel delivery line 150A, a second fuel delivery line 150B, and a third fuel delivery line 150C. The flow divider 274 divides the fuel flow from the fuel source 148 and fuel pump 272 into a first fuel flow through the first fuel delivery line 150A to the fuel cell assembly 204, a second fuel flow through the second fuel delivery line 150B also to the fuel cell assembly 204 (and in particular to an air processing unit, described below), and a third fuel flow through a third fuel delivery line 150C to the combustor 206. The flow divider 274 may include a series of valves (not shown) to facilitate such dividing of the fuel flow from the fuel source 148, or alternatively may be of a fixed geometry. Additionally, for the embodiment shown, the fuel delivery system 146 includes a first fuel valve 151A associated with the first fuel delivery line 150A (e.g., for controlling the first fuel flow), a second fuel valve 151B associated with the second fuel delivery line 150B (e.g., for controlling the second fuel flow), and a third fuel valve 151C associated with the third fuel delivery line 150C (e.g., for controlling the third fuel flow).

The gas turbine engine 100 further includes a compressor bleed system and an airflow delivery system. More specifically, the compressor bleed system includes an LP bleed air duct 276 and an associated LP bleed air valve 278, an HP bleed air duct 280 and an associated HP bleed air valve 282, an HP exit air duct 284 and an associated HP exit air valve 286.

The gas turbine engine 100 further includes an air stream supply duct 288 (in airflow communication with an airflow supply 290) and an associated air valve 292, which is also in airflow communication with the airflow delivery system for providing compressed airflow to the fuel cell assembly 204 of the integrated fuel cell and combustor assembly 200. The airflow supply may be, e.g., a second gas turbine engine configured to provide a cross-bleed air, an auxiliary power unit (APU) configured to provide a bleed air, a ram air turbine (RAT), etc. The airflow supply may be complimentary to the compressor bleed system if the compressor air source is inadequate or unavailable.

The compressor bleed system (and air stream supply duct 288) is in airflow communication with airflow delivery system for providing compressed airflow to the fuel cell assembly 204, as will be explained in more detail below.

Referring still to FIG. 5, the fuel cell assembly 204 of the integrated fuel cell and combustor assembly 200 includes a fuel cell stack 294, which may be configured in a similar manner as, e.g., the first fuel cell stack 232 described above. The fuel cell stack 294 is depicted schematically as a single fuel cell having a cathode side 296, an anode side 298, and an electrolyte 300 positioned therebetween. As will generally be appreciated, the electrolyte 300 may, during operation, conduct negative oxygen ions from the cathode side 296 to the anode side 298 to generate an electric current and electric power.

Briefly, it will be appreciated that the fuel cell assembly 204 further includes a fuel cell sensor 302 configured to sense data indicative of a fuel cell assembly operating parameter, such as a temperature of the fuel cell stack 294 (e.g., of the cathode side 296 or anode side 298 of the fuel cell), a pressure within the fuel cell stack 294 (e.g., of within the cathode side 296 or anode side 298 of the fuel cell).

The fuel cell stack 294 is disposed downstream of the LP compressor 110, the HP compressor 112, or both. Further, as will be appreciated from the description above with respect to FIG. 2, the fuel cell stack 294 may be coupled to or otherwise integrated with a liner of the combustor 206 (e.g., an inner liner 208 or an outer liner 210). In such a manner, the fuel cell stack 294 may also be arranged upstream of a combustion chamber 228 of the integrated fuel cell and combustor assembly 200, and further upstream of the HP turbine 116 and LP turbine 118.

As shown in FIG. 5, the fuel cell assembly 204 also includes a fuel processing unit 304 and an air processing unit 306. The fuel processing unit 304 may be any suitable structure for generating a hydrogen rich fuel stream. For example, the fuel processing unit 304 may include a fuel reformer or a catalytic partial oxidation convertor (CPOx) for developing the hydrogen rich fuel stream for the fuel cell stack 294. The air processing unit 306 may be any suitable structure for raising the temperature of air that is provided thereto to a temperature high enough to enable fuel cell temperature control (e.g., about 600° C. to about 800° C.). For example, in the embodiment depicted, the air processing unit includes a preburner system, operating based on a fuel flow through the second fuel delivery line 150B, configured for raising the temperature of the air through combustion, e.g., during transient conditions such as startup, shutdown and abnormal situations.

In the exemplary embodiment depicted, the fuel processing unit 304 and air processing unit 306 are manifolded together within a housing 308 to provide conditioned air and fuel to the fuel cell stack 294.

It should be appreciated, however, that the fuel processing unit 304 may additionally or alternatively include any suitable type of fuel reformer, such as an autothermal reformer and steam reformer that may need an additional stream of steam inlet with higher hydrogen composition at the reformer outlet stream. Additionally, or alternatively, still, the fuel processing unit 304 may include a reformer integrated with the fuel cell stack 294. Similarly, it should be appreciated that the air processing unit 306 of FIG. 5 could alternatively be a heat exchanger or another device for raising the temperature of the air provided thereto to a temperature high enough to enable fuel cell temperature control (e.g., about 600° C. to about 800° C.).

As mentioned above, the compressor bleed system (and air stream supply duct 288) is in airflow communication with airflow delivery system for providing compressed airflow to the fuel cell assembly 204. The airflow delivery system includes an anode airflow duct 310 and an associated anode airflow valve 312 for providing an airflow to the fuel processing unit 304, a cathode airflow duct 314 and associated cathode airflow valve 316 for providing an airflow to the air processing unit 306, and a cathode bypass air duct 318 and an associated cathode bypass air valve 320 for providing an airflow directly to the fuel cell stack 294 (or rather to the cathode side 296 of the fuel cell(s)). The fuel delivery system 146 is configured to provide the first flow of fuel through the first fuel delivery line 150A to the fuel processing unit 304, and the second flow of fuel through the second fuel delivery line 150B to the air processing unit 306 (e.g., as fuel for a preburner system, if provided).

The fuel cell stack 294 outputs the power produced as a fuel cell power output 322. Further, the fuel cell stack 294 directs a cathode air discharge and an anode fuel discharge (neither labeled for clarity purposes) into the combustion chamber 228 of the combustor 206.

In operation, the air processing unit 306 is configured to heat/cool a portion of the compressed air, incoming through the cathode airflow duct 314, to generate a processed air to be directed into the fuel cell stack 294 to facilitate the functioning of the fuel cell stack 294. The air processing unit 306 receives the second flow of fuel from the second fuel delivery line 150B and may, e.g., combust such second flow of fuel to heat the air received to a desired temperature (e.g., about 600° C. to about 800° C.) to facilitate the functioning of the fuel cell stack 294. The air processed by the air processing unit 306 is directed into the fuel cell stack 294. In an embodiment of the disclosure, as is depicted, the cathode bypass air duct 318 and the air processed by the air processing unit 306 may combine into a combined air stream to be fed into a cathode 552 of the fuel cell stack 294.

Further, as shown in the embodiment of FIG. 5, the first flow of fuel through the first fuel delivery line 150A is directed to the fuel processing unit 304 for developing a hydrogen rich fuel stream (e.g., optimizing a hydrogen content of a fuel stream), to also be fed into the fuel cell stack 294. As will be appreciated, and as discussed below, the flow of air (processed air and bypass air) to the fuel cell stack 294 (e.g., the cathode side 296) and fuel from the fuel processing unit 304 to the fuel cell stack 294 (e.g., the anode side 298) may facilitate electrical power generation.

Because the inlet air for the fuel cell stack 294 may come solely from the upstream compressor section without any other separately controlled air source, it will be appreciated that the inlet air for the fuel cell stack 294 discharged from the compressor section is subject to the air temperature changes that occur at different flight stages. By way of illustrative example only, the air within a particular location in the compressor section of the gas turbine engine 100 may work at 200° C. during idle, 600° C. during take-off, 268° C. during cruise, etc. This type of temperature change to the inlet air directed to the fuel cell stack 294 may lead to significant thermal transient issues (or even thermal shock) to the ceramic materials of the fuel cell stack 294, which could range from cracking to failure.

Thus, by fluidly connecting the air processing unit 306 between the compressor section and the fuel cell stack 294, the air processing unit 306 may serve as a control device or system to maintain the air processed by the air processing unit 306 and directed into the fuel cell stack 294 within a desired operating temperature range (e.g., plus or minus 100° C., or preferably plus or minus 50° C., or plus or minus 20° C.). In operation, the temperature of the air that is provided to the fuel cell stack 294 can be controlled (relative to a temperature of the air discharged from the compressor section) by controlling the flow of fuel to the air processing unit 306. By increasing a fuel flow to the air processing unit 306, a temperature of the airflow to the fuel cell stack 294 may be increased. By decreasing the fuel flow to the air processing unit 306, a temperature of the airflow to the fuel cell stack 294 may be decreased. Optionally, no fuel can be delivered to the air processing unit 306 to prevent the air processing unit 306 from increasing and/or decreasing the temperature of the air that is discharged from the compressor section and directed into the air processing unit 306.

Moreover, as is depicted in phantom, the fuel cell assembly 204 further includes an airflow bypass duct 321 extending around the fuel cell 294 to allow a portion or all of an airflow conditioned by the air processing unit 306 (and combined with any bypass air through duct 318) to bypass the cathode side 296 of the fuel cell 294 and go directly to the combustion chamber 228. The bypass duct 321 may be in thermal communication with the fuel cell 294. The fuel cell assembly further includes a fuel bypass duct 323 extending around the fuel cell 294 to allow a portion or all of a reformed fuel from the fuel processing unit 304 to bypass the anode side 298 of the fuel cell 294 and go directly to the combustion chamber 228.

As briefly mentioned above, the fuel cell stack 294 converts the anode fuel stream from the fuel processing unit 304 and air processed by the air processing unit 306 sent into the fuel cell stack 294 into electrical energy, the fuel cell power output 322, in the form of DC current. This fuel cell power output 322 is directed to a power convertor 324 in order to change the DC current into DC current or AC current that can be effectively utilized by one or more subsystems. In particular, for the embodiment depicted, the electrical power is provided from the power converter to an electric bus 326. The electric bus 326 may be an electric bus dedicated to the gas turbine engine 100, an electric bus of an aircraft incorporating the gas turbine engine 100, or a combination thereof. The electric bus 326 is in electric communication with one or more additional electrical devices 328, which may be a power source, a power sink, or both. For example, the additional electrical devices 328 may be a power storage device (such as one or more batteries), an electric machine (an electric generator, an electric motor, or both), an electric propulsion device, etc. For example, the one or more additional electric devices 328 may include the starter motor/generator of the gas turbine engine 100.

Referring still to FIG. 5, the gas turbine engine 100 further includes a sensor 330. In the embodiment shown, the sensor 330 is configured to sense data indicative of a flame within the combustion section 114 of the gas turbine engine 100. The sensor 330 may be, for example, a temperature sensor configured to sense data indicative of an exit temperature of the combustion section 114, an inlet temperature of the turbine section, an exhaust gas temperature, or a combination thereof. Additionally, or alternatively, the sensor 330 may be any other suitable sensor, or any suitable combination of sensors, configured to sense one or more gas turbine engine operating conditions or parameters, including data indicative of a flame within the combustion section 114 of the gas turbine engine 100.

Moreover, as is further depicted schematically in FIG. 5, the propulsion system, an aircraft including the propulsion system, or both, includes a controller 240. For example, the controller 240 may be a standalone controller, a gas turbine engine controller (e.g., a full authority digital engine control, or FADEC, controller), an aircraft controller, supervisory controller for a propulsion system, a combination thereof, etc.

The controller 240 is operably connected to various the sensors, valves, etc. within at least one of the gas turbine engine 100 and the fuel delivery system 146. More specifically, for the exemplary aspect depicted, the controller 240 is operably connected to the valves of the compressor bleed system (valves 278, 282, 286), the airflow delivery system (valves 312, 316, 320), and the fuel delivery system 146 (flow divider 274, valves 151A, 151B, 151C), as well as the sensor 330 of the gas turbine engine 100 and the fuel cell sensor 302. As will be appreciated from the description below, the controller 240 may be in wired or wireless communication with these components. In this manner, the controller 240 may receive data from a variety of inputs (including the gas turbine engine sensor 330 and the fuel cell sensor 302), may make control decisions, and may provide data (e.g., instructions) to a variety of output (including the valves of the compressor bleed system to control an airflow bleed from the compressor section, the airflow delivery system to direct the airflow bled from the compressor section, and the fuel delivery system 146 to direct the fuel flow within the gas turbine engine 100).

Referring particularly to the operation of the controller 240, in at least certain embodiments, the controller 240 can include one or more computing device(s) 332. The computing device(s) 332 can include one or more processor(s) 332A and one or more memory device(s) 332B. The one or more processor(s) 332A can include any suitable processing device, such as a microprocessor, microcontroller, integrated circuit, logic device, and/or other suitable processing device. The one or more memory device(s) 332B can include one or more computer-readable media, including, but not limited to, non-transitory computer-readable media, RAM, ROM, hard drives, flash drives, and/or other memory devices.

The one or more memory device(s) 332B can store information accessible by the one or more processor(s) 332A, including computer-readable instructions 332C that can be executed by the one or more processor(s) 332A. The instructions 332C can be any set of instructions that when executed by the one or more processor(s) 332A, cause the one or more processor(s) 332A to perform operations. In some embodiments, the instructions 332C can be executed by the one or more processor(s) 332A to cause the one or more processor(s) 332A to perform operations, such as any of the operations and functions for which the controller 240 and/or the computing device(s) 332 are configured, the operations for operating a propulsion system (e.g., method 600), as described herein, and/or any other operations or functions of the one or more computing device(s) 332. The instructions 332C can be software written in any suitable programming language or can be implemented in hardware. Additionally, and/or alternatively, the instructions 332C can be executed in logically and/or virtually separate threads on processor(s) 332A. The memory device(s) 332B can further store data 332D that can be accessed by the processor(s) 332A. For example, the data 332D can include data indicative of power flows, data indicative of gas turbine engine 100/aircraft operating conditions, and/or any other data and/or information described herein.

The computing device(s) 332 also includes a network interface 332E configured to communicate, for example, with the other components of the gas turbine engine 100 (such as the valves of the compressor bleed system (valves 278, 282, 286), the airflow delivery system (valves 312, 316, 320), and the fuel delivery system 146 (flow divider 274, valves 151A, 151B, 151C), as well as the sensor 330 of the gas turbine engine 100 and the fuel cell sensor 302), the aircraft incorporating the gas turbine engine 100, etc. The network interface 332E can include any suitable components for interfacing with one or more network(s), including for example, transmitters, receivers, ports, controllers, antennas, and/or other suitable components. In such a manner, it will be appreciated that the network interface 332E may utilize any suitable combination of wired and wireless communications network(s).

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

It will be appreciated that the gas turbine engine 100, the exemplary fuel delivery system 146, the exemplary integrated fuel cell and combustor assembly 200, and the exemplary fuel cell assembly 204 are provided by way of example only. In other embodiments, the integrated fuel cell and combustor assembly 200 and fuel cell assembly 204 may have any other suitable configuration. For example, in other exemplary embodiments, the fuel cell assembly 204 may include any other suitable fuel processing unit 304. Additionally, or alternatively, the fuel cell assembly 204 may not require a fuel processing unit 304, e.g., when the combustor of the gas turbine engine 100 is configured to burn hydrogen fuel and the fuel delivery assembly 146 is configured to provide hydrogen fuel to the integrated fuel cell and combustor assembly 200, and in particular to the fuel cell assembly 204.

Figure 6:
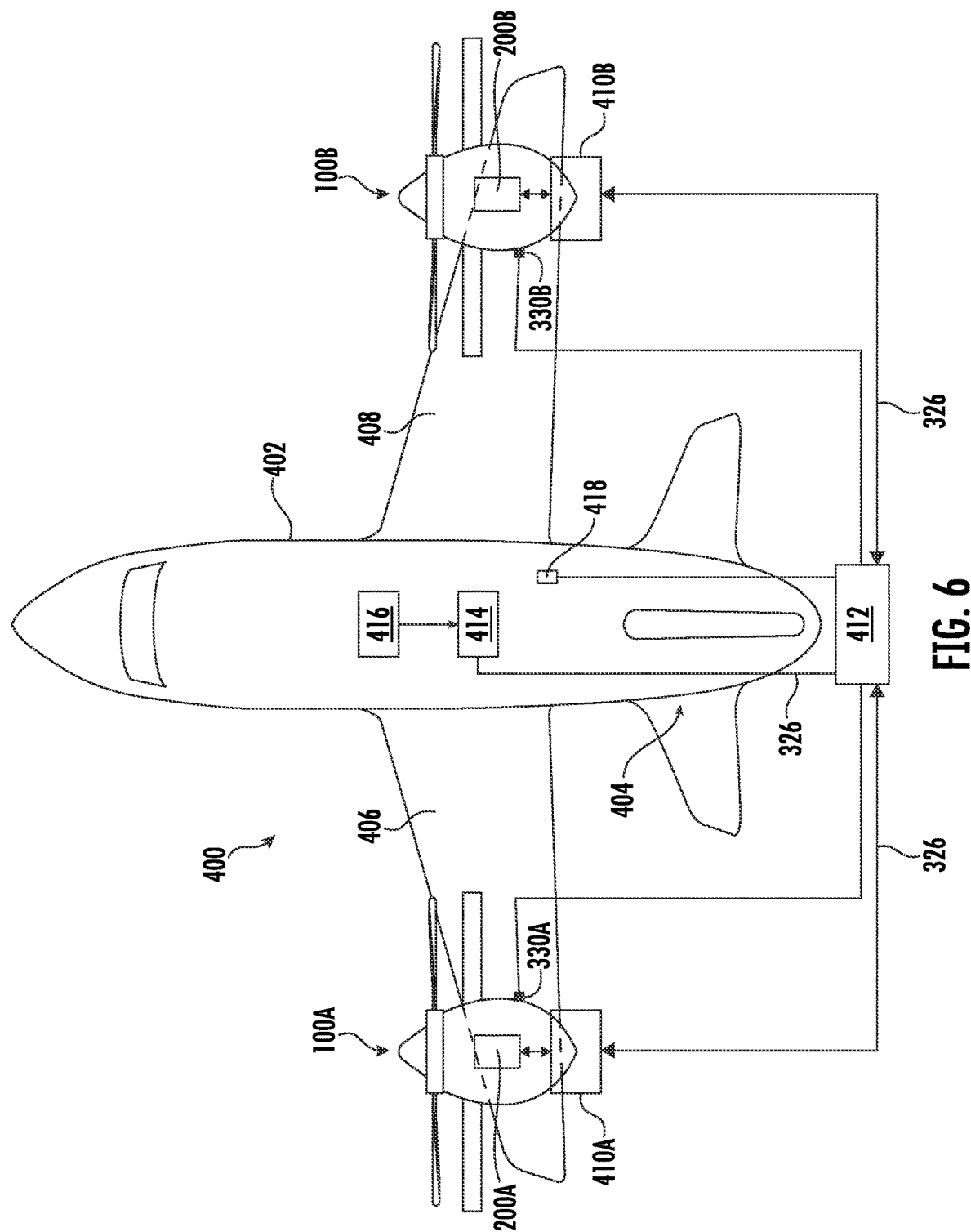
FIG. 6 is a schematic view of a vehicle and propulsion system in accordance with an exemplary aspect of the present disclosure.

As briefly mentioned above, the fuel cell assembly 204 may be in electrical communication with the electric bus 326, which may be an electric bus of the gas turbine engine 100, of an aircraft, or a combination thereof. Referring now briefly to FIG. 6, a schematic view is provided of an aircraft 400 in accordance with an embodiment of the present disclosure including one or more gas turbine engines 100 (labeled 100A and 100B), each with an integrated fuel cell and combustor assembly 200 (labeled 200A and 200B), and an aircraft electric bus 326 in electrical communication with the one or more gas turbine engines 100.

In particular, for the exemplary embodiment depicted, the aircraft 400 is provided including a fuselage 402, an empennage 404, a first wing 406, a second wing 408, and a propulsion system. The propulsion system generally includes a first gas turbine engine 100A coupled to, or integrated with, the first wing 406 and a second gas turbine engine 100B coupled to, or integrated with, the second wing 408. It will be appreciated, however, that in other embodiments, any other suitable number and or configuration of gas turbine engines 100 may be provided (e.g., fuselage-mounted, empennage-mounted, etc.).

The first gas turbine engine 100A generally includes a first integrated fuel cell and combustor assembly 200A and a first electric machine 410A. The first integrated fuel cell and combustor assembly 200A may generally include a first fuel cell assembly. The first electric machine 410A may be an embedded electric machine, an offset electric machine (e.g., rotatable with the gas turbine engine 100 through an accessory gearbox or suitable geartrain), etc. For example, in certain exemplary embodiments, the first electric machine 410A may be a starter motor/generator for the first gas turbine engine 100A.

Similarly, the second gas turbine engine 100B generally includes a second integrated fuel cell and combustor assembly 200B and a second electric machine 410B. The second integrated fuel cell and combustor assembly 200B may generally include a second fuel cell assembly. The second electric machine 410B may also be an embedded electric machine, an offset electric machine (e.g., rotatable with the gas turbine engine 100 through an accessory gearbox or suitable geartrain), etc. For example, in certain exemplary embodiments, the second electric machine 410B may be a starter motor/generator for the second gas turbine engine 100B.

In the embodiment of FIG. 6, the aircraft 400 additionally includes the electric bus 326 and a supervisory controller 412. Further, it will be appreciated that the aircraft 400 and/or propulsion system includes one or more electric devices 414 and an electric energy storage unit 416, each in electric communication with the electric bus 326. The electric devices 414 may represent one or more aircraft power loads (e.g., avionics systems, control systems, electric propulsors, etc.), one or more electric power sources (e.g., an auxiliary power unit), etc. The electric energy storage unit 416 may be, e.g., a battery pack or the like for storing electric power.

The electric bus 326 further electrically connects to the first electric machine 410A and first fuel cell assembly, as well as to the second electric machine 410B and second fuel cell assembly. The supervisory controller 412 may be configured in a similar manner as the controller 240 of FIG. 5 or may be in operative communication with a first gas turbine engine controller dedicated to the first gas turbine engine 100A and a second gas turbine engine controller dedicated to the second gas turbine engine 100B.

In such a manner, it will be appreciated that the supervisory controller 412 may be configured to receive data from a gas turbine engine sensor 330A of the first gas turbine engine 100A and from a gas turbine engine sensor 330B of the second gas turbine engine 100B, and may further be configured to send data (e.g., commands) to various control elements (such as valves) of the first and second gas turbine engines 100A, 100B.

Moreover, it will be appreciated that for the embodiment depicted, the aircraft 400 includes one or more aircraft sensor(s) 418 configured to sense data indicative of various flight operations of the aircraft 400, including, e.g., altitude, ambient temperature, ambient pressure, airflow speed, etc. The supervisory controller 412 is operably connected to these aircraft sensor(s) 418 to receive data from such aircraft sensor(s) 418.

In addition to receiving data from sensors 330A, 330B, 418 and sending data to control elements, the supervisory controller 412 is configured to control a flow of electric power through the electric bus 326. For example, the supervisory controller 412 may be configured to command and receive a desired power extraction from one or more of the electric machines (e.g., the first electric machine 410A and second electric machine 410B), one or more of the fuel cell assemblies (e.g., the first fuel cell assembly and second fuel cell assembly), or both, and provide all or a portion of the extracted electric power to other of the one or more of the electric machines (e.g., the first electric machine 410A and second electric machine 410B), one or more of the fuel cell assemblies (e.g., the first fuel cell assembly and second fuel cell assembly), or both. One or more of these actions may be taken in accordance with the logic outlined below.

As will be appreciated, when starting a gas turbine engine, such as one or more of the exemplary gas turbine engines 100 described herein, a rotational speed of an HP compressor, an HP turbine, and an HP shaft, collectively referred to as an HP spool herein for convenience, generally starts off at 0 revolutions per minute ("rpm"). An initial rotation is generated by a starter, which may be an electric starter or a pneumatic starter. With an electric starter, an electric machine is rotatably coupled to the HP spool, and in response to receiving power from, e.g., an auxiliary power unit ("APU") within an aircraft incorporating the gas turbine engine or an external power source (e.g., a ground cart), may drive the HP spool until it reaches a minimum ignition speed. The minimum ignition speed is the minimum speed that the HP spool must be operating in order to provide sufficient airflow to a combustion section of the gas turbine engine to facilitate ignition and sustained combustion operations of the gas turbine engine (i.e., maintain a flame within a combustion chamber). As such, it will be appreciated that altitude may affect the minimum ignition speed, as at higher altitudes, generally less oxygen is present in the ambient air, and similarly ambient temperature may affect the minimum ignition speed. Once the HP spool meets or exceeds the minimum ignition speed, fuel may be provided to the combustion chamber and ignited with an ignitor positioned within, or adjacent to, the combustion chamber. Once ignited, a continuous flow of air and fuel to the combustion chamber may sustain the flame within the combustion chamber through a flight mission of the gas turbine engine.

Occasionally during a flight operation of the gas turbine engine 100, however, the flame within combustion chamber is extinguished. This event may be referred to as a mid-flight "flame out" event. Such may be the result of bird ingestion, ice ingestion, a gas turbine engine malfunction, etc. In order to continue flight operations, combustion must resume within the combustion section, meaning the flame must be relit within the combustion chamber (referred to as a "relight" of the gas turbine engine).

The ability to relight the gas turbine engine 100 may be based on a variety of factors, including a flight speed, an altitude, and a temperature within the combustion chamber. For example, referring briefly to FIG. 7, a chart 500 is provided showing a relationship between an equivalence ratio (on a y-axis, 502) to temperature (on an x-axis, 504) as a means for explanation of this concept. It will be appreciated that the temperatures and equivalence ratios depicted are by way of example only. More specifically, it will be appreciated from reference to this chart that the equivalence ratio—a ratio of an actual fuel/air ratio to a stoichiometric fuel/air ratio for a particular fuel—must be less than a rich flammability limit 506 and a lean flammability limit 508 in order to ignite the fuel. As will be appreciated, a delta between the rich and lean flammability limits 506, 508 increases with an increase in a temperature of the fuel and air mixture.

With respect to the fuel to air ratio/equivalence ratio, it will be appreciated that the fuel to air ratio within the combustion chamber may be affected most by the flight speed and altitude. With a high flight speed, more airflow is generally provided through the gas turbine engine, and with a low flight speed less airflow is provided through the gas turbine engine. Additionally, at a higher altitude, there is less oxygen in the air (meaning more air is need) and at a lower altitude, there is more oxygen in the air (meaning less air is needed).

Figure 7:
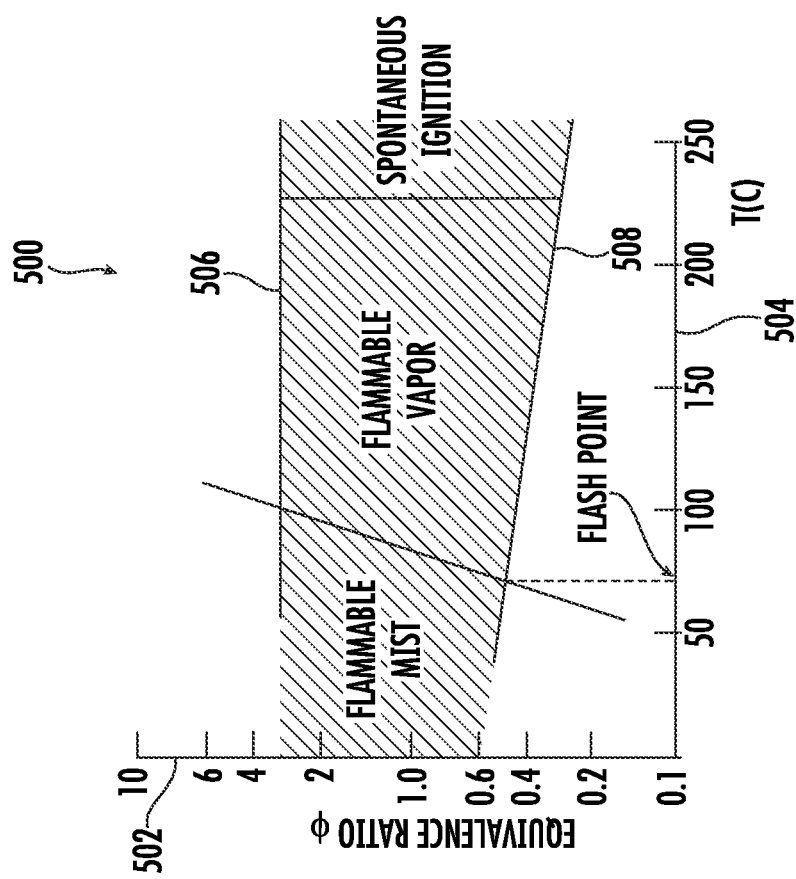
FIG. 7 is a chart is depicting a relationship between an equivalence ratio of a fuel in accordance with an exemplary aspect of the present disclosure to temperature.

It should be appreciated, however, that the chart 500 of FIG. 7 is provided by way of example only for the purposes of discussing the fundamental theory of flammability. The limits described and depicted in FIG. 7 are dependent on a number of factors, including, e.g., the fuel composition, mass flow rate of the air, pressure of the air, etc.

Determining a strategy for relighting a gas turbine engine may therefore be based at least in part on the flight speed and altitude of the gas turbine engine. For example, referring now to FIG. 8, a chart 520 is provided relating an altitude of a gas turbine engine on a y-axis 522 to a flight speed of an aircraft incorporating the gas turbine engine on an x-axis 524. It will be appreciated that the altitudes and flight speeds depicted are by way of example only. Based on the flight speed and the altitude, there may generally be three types of relight strategies.

First, for a relatively low flight speed and altitude, a "quick relight" strategy may be used, depicted in a first region 526. For example, when the gas turbine engine is inadvertently shut down as a result of, e.g., a brief interruption of the fuel flow, or an erroneous shut-down command from the pilot, the restart may be initiated within a brief window from the flameout event (e.g., less than about 5 seconds). Assuming fuel flow is continued, a stoichiometric ratio within the combustion chamber, and a temperature within the combustion chamber, may be sufficient to facilitate the relight.

Second, for a relatively high flight speed and at altitude, a "windmill start" strategy may be used, depicted in a second region 528. With this strategy, ambient airflow through the gas turbine engine may provide a sufficient rotational speed for the HP spool to provide a desired compression of the airflow therethrough (relatively low altitude, relatively oxygen-dense airflow) to allow for a desired stoichiometric ratio within the combustion chamber to facilitate the relight.

Third, for a very low flight speed scenario, an "assisted start" strategy may be used, depicted in a third region 530. Although the HP spool may be rotated by the ambient airflow through then gas turbine engine in this situation, such a rotation may not be sufficient to provide a desired concentration of oxygen to generate the stoichiometric ratio desired within the combustion chamber to facilitate the relight. With such a configuration, power generally may need to be added to help facilitate the relight of the gas turbine engine. For example, with an electric starter, power may be provided to the electric starter such that the electric starter may motor the HP spool to provide a sufficient compression of the airflow through the gas turbine engine to achieve a desired stoichiometric ratio within the combustion chamber to facilitate the relight.

Figure 8:
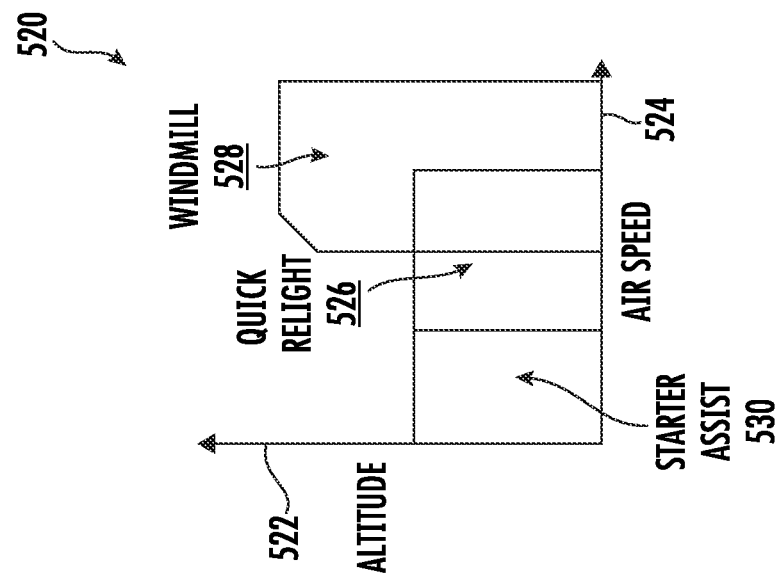
FIG. 8 is a chart relating an altitude of a gas turbine engine to a flight speed of an aircraft incorporating the gas turbine engine.

Notably, it is possible to move from one region to another to utilize a different relight strategy by, e.g., slowing down or reducing altitude. Further, it will be appreciated that at elevated altitudes, it may not be possible or practical to employ any of the three relight strategies described. In such a scenario, it may be necessary to reduce an altitude to enter into, e.g., the second region 528 where a windmill start may be attempted. As will also be appreciated, aspects of the present disclosure may enlarge these regions 526, 528, 530. As will further be appreciated, the regions 526, 528, 530 set forth in FIG. 8 are for explanation purposes only. Different engines may have different regions (and/or different sized regions), and even the same model engines may have different regions (and/or different sized regions) due to variations in the individual engines.

As mentioned, the present disclosure generally relates to a gas turbine engine incorporating an integrated fuel cell and combustor assembly having a fuel cell assembly. The inventors of the present disclosure have discovered that certain operations of the fuel cell assembly may have a downstream effect on various parameters which may advantageously assist with a relight of the gas turbine engine.

Figure 9:
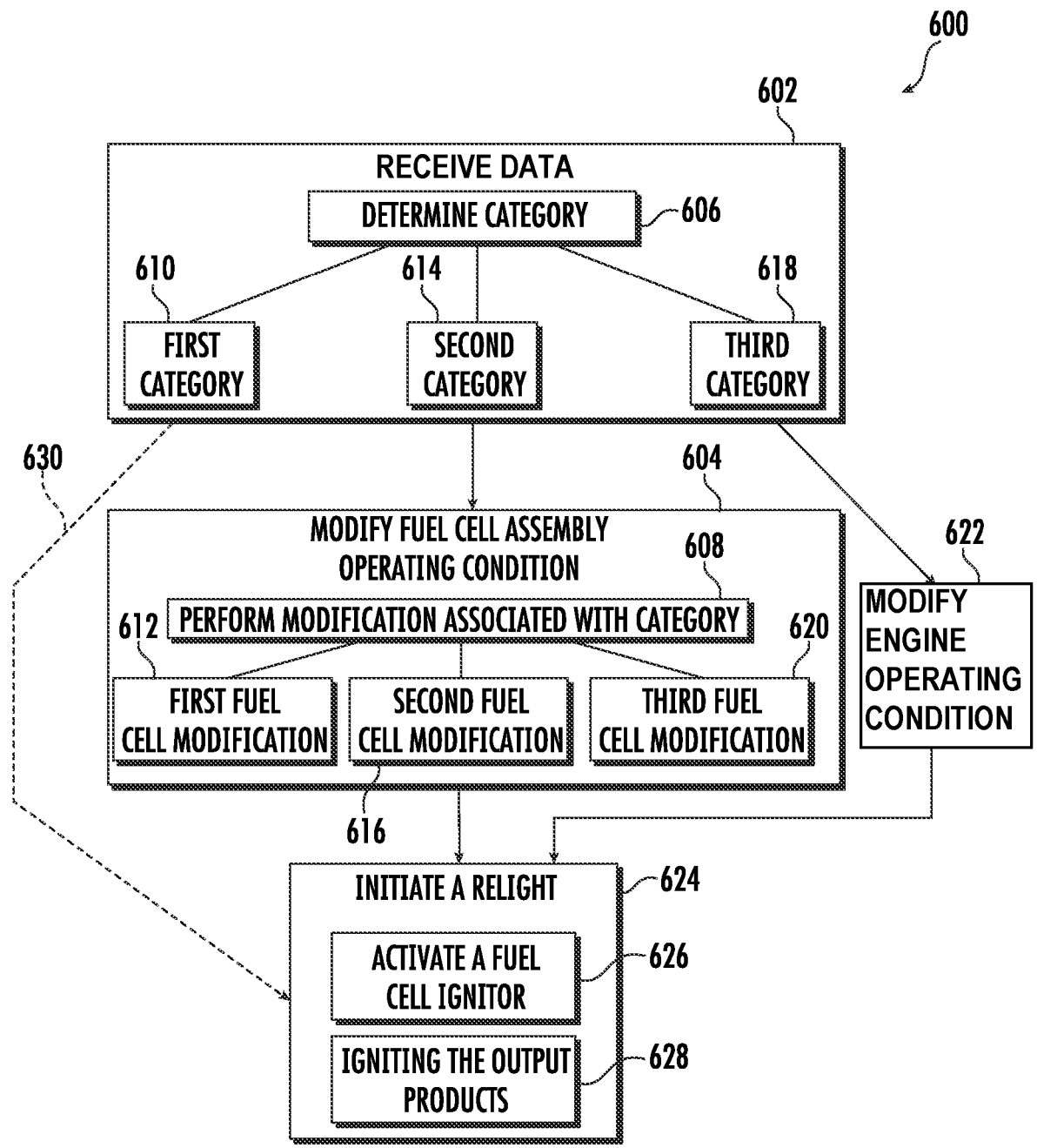
FIG. 9 is a flow diagram of a method for operating a propulsion system for an aircraft in accordance with an exemplary aspect of the present disclosure.

For example, referring now to FIG. 9, a flow diagram of a method for operating a propulsion system for an aircraft, or more specifically, a method 600 for relighting a gas turbine engine of a propulsion system of an aircraft, is provided. In certain exemplary aspects, the method 600 may be used with one or more of the exemplary integrated fuel cell and combustor assemblies 200 having a fuel cell assembly 204, gas turbine engines 100, and/or aircraft described above with respect to FIGS. 1 through 8. Additionally, or alternatively, the method 600 may be used with any other suitable integrated fuel cell and combustor assemblies having a fuel cell assembly, gas turbine engines, and/or aircraft.

Accordingly, it will be appreciated that the method 600 may be utilized with a propulsion system for an aircraft. The aircraft may generally include an aircraft fuel supply. The propulsion system may generally include a gas turbine engine with an integrated fuel cell and combustor assembly and a turbomachine. The integrated fuel cell and combustor assembly may generally include a fuel cell, a fuel processing unit (having, e.g., a fuel reformer), and an air processing unit (having, e.g., a preburner system). The fuel cell may define an outlet positioned to remove output products from the fuel cell. The turbomachine may generally include a compressor section, a combustion section, and a turbine section arranged in serial flow order. The combustion section is configured to receive a flow of aviation fuel from the aircraft fuel supply and is further configured to receive the output products from the fuel cell.

The method 600 includes at (602) receiving data indicative of a mid-flight flameout within the combustion section. Receiving data at (602) may include receiving data indicative of a temperature within the turbomachine, a pressure within the turbomachine, a rotational speed of one or more components of the turbomachine, or the like. For example, receiving data at (602) may include receiving data from an engine sensor indicative of a drop in a combustion section temperature, turbine section temperature, or exhaust temperature, such as data indicative of a drop in a turbine inlet temperature, the drop exceeding a predetermined threshold. It will be appreciated that as used herein, the term "mid-flight flameout" refers to a flameout condition while the aircraft is airborne. For example, a mid-flight flameout may refer to a flameout condition during a takeoff operating condition, a climb operating condition, a cruise operating condition, a descent operating condition, etc.

The fuel cell assembly defines a fuel cell assembly operating condition. The method 600 further includes at (604) modifying the fuel cell assembly operating condition in response to receiving data indicative of the mid-flight flameout within the combustion section at (602). As will be appreciated, and as will be discussed below, the fuel cell assembly operating condition may be at least one of a fuel operating condition, an air operating condition, a fuel cell exhaust condition, or a fuel cell operating condition.

The fuel operating condition may include, e.g., a reformed fuel flowrate to the fuel cell, a bypass ratio of reformed fuel around a stack (the stack including a stack of fuel cells, including the fuel cell previously mentioned) to the combustion chamber, a reformation or conversion rate of a fuel flow through the fuel conditioning unit, a fuel temperature (e.g., a peak fuel temperature in the fuel processing unit or an exit temperature of the fuel from the fuel processing unit (each affecting fuel composition to the fuel cell stack)), a fuel temperature downstream of a fuel heat exchanger (e.g., thermally coupled to an engine accessory system, such as a lubrication oil system), a fuel to air ratio in the fuel processing unit, a fuel processing unit gas hourly space velocity (total gas flowrate), etc. Increasing the reformed fuel flowrate to the fuel cell may increase a fuel to air ratio in the output products provided to the combustion chamber, as there may be more hydrogen gas ($H_2$) than oxygen electrons in the airflow provided to the fuel cell, such that more $H_2$ passes through the stack unconverted to water ($H_2O$). This may result in an increase of an overall fuel to air ratio in the combustion chamber. Similarly, increasing a bypass ratio of reformed fuel around the stack of fuel cells to the combustion chamber may also increase an overall fuel to air ratio in the combustion chamber.

The air operating condition may include, e.g., an air flowrate to the fuel cell, a bypass ratio of air flow around the fuel cell (and around the stack), a volume of airflow received by the air processing unit of the fuel cell assembly (which may be directly tied to a bleed air rate within the combustion section of the gas turbine engine), an amount of fuel provided to the air processing unit (e.g., the preburner), an amount of fuel in the airflow from the air processing unit (e.g., unburned preburner fuel provided from second fuel delivery line 150B), a temperature of the airflow from the air processing unit, an airflow inlet temperature to the fuel cell stack, etc. These air operating conditions may similarly affect an overall fuel to air ratio in the output products to the combustion chamber (and/or in the combustion chamber directly), depending on any changes to the fuel operating condition. In such a manner, it will be appreciated that in certain exemplary aspects, modifying the fuel cell assembly operating condition at (604) may include increasing an airflow to the fuel cell from the compressor section. It should be pointed out, that increasing the airflow received by the air processing unit may have the effect of reducing an amount of airflow provided to the combustion chamber (from the compressor section), such that a local fuel to air ratio at an entrance to the combustion chamber may be increased, such that more favorable relight conditions may be achieved. Such a result may be especially beneficial for a windmilling condition (e.g., second region 528 in FIG. 8), where the high rotating speed may lead to too high air flow speed at a main entrance to the combustor, which may cause a "flame blow-off" because the flame cannot be stabilized. By reducing the air flowrate to the main entrance to the combustor and bypassing airflow to a downstream location through the fuel cell assembly (and through the combustor liner(s)), the issue of "flame blow-off" may be alleviated. Further, such a modification may also increase a temperature of the airflow provided to the combustion chamber as a result of such airflow passing through the fuel cell assembly, which may further increase the acceptable stoichiometric range for combustion within the combustion chamber.

The fuel cell exhaust condition may include, e.g., fuel cell assembly output product compositions (e.g., an $H_2$%, a CO %, a $CO_2$%, an $H_2O$ %, a $CH_4$%, and/or an $N_2$% in the anode, and an $O_2$%, and/or an $N_2$% in the cathode), a fuel cell assembly output product total flowrate, a fuel cell assembly output product air/fuel flowrate ratio, a fuel cell assembly output product temperature, and a fuel cell assembly output product velocity. In such a manner, modifying the fuel cell assembly operating condition at (604) may include modifying one or more of these parameters.

The fuel operating condition, the air operating condition, or both may be modified to adjust a fuel to air ratio of the output products provided to the combustion chamber. In such a manner, modifying the fuel cell assembly operating condition at (604) may include adjusting a ratio of a flow of reformed fuel to the fuel cell to a flow of air to the fuel cell, e.g., to adjust a fuel to air ratio of the output products provided to the combustion chamber.

The fuel cell operating condition may include, e.g., a current drawn from the fuel cell. In such a manner, modifying the fuel cell assembly operating condition at (604) may include reducing an electrical output of the fuel cell, or alternatively may include increasing an electric load on the fuel cell.

Increasing the current drawn from the fuel cell may, e.g., result in more complete reaction between free oxygen in the airflow to the fuel cell and the hydrogen gas in the reformed fuel to the fuel cell, in turn resulting in a decrease in the fuel to air ratio of the output products provided to the combustion chamber. Such may further provide more electrical power to an electric bus of the gas turbine engine/aircraft, and may also increase a temperature of the output products provided to the combustion chamber (as the increased reaction generates heat). Accordingly, increasing an electrical power output from the fuel cell may further allow for reducing an electrical power output of an electric machine rotatable with a core of the gas turbine engine, in turn resulting in a reduced "drag load" on the gas turbine engine. Such a result may facilitate faster engine speed-up with less additional rotor startup energy needed.

By contrast, decreasing a current drawn from the fuel cell (i.e., reducing the electrical output of the fuel cell) may, e.g., result in a less complete reaction between free oxygen in the airflow to the fuel cell and the hydrogen gas in the reformed fuel to the fuel cell, in turn resulting in an increase in the fuel to air ratio of the output products provided to the combustion chamber. Moreover, such may require an increased amount of power extraction from an electric machine rotatable with a core of the gas turbine engine, resulting in more drag on the core, slowing down the core of the gas turbine engine.

Each of these operating conditions may be modified to drive certain changes within the gas turbine engine, such as: a composition of the output products of the fuel cell (e.g., a percentage of $H_2$ within the output products, an overall fuel to air ratio of the output products, a temperature of the output products) and thus an overall composition within the combustion chamber (e.g., an overall fuel to air ratio in the combustion chamber, a percentage (e.g., a volume percentage) of $H_2$ within the combustion chamber, a temperature within the combustion chamber, a local fuel to air ratio within the combustion chamber (e.g., at the entrance), etc.); a rotational speed of the gas turbine engine (e.g., if more power is provided by the fuel cell assembly, less power may need to be extracted from an electric generator coupled to the gas turbine engine, or by inverse, if less power is provided by the fuel cell assembly, more power may need to be extracted from the electric generator coupled to the gas turbine engine—each affecting a drag on rotating components of the gas turbine engine and thus rotational speeds); etc. In such a manner, it will be appreciated that modifying the fuel cell assembly operating condition at (604) may include, e.g., increasing a fuel to air ratio within the combustion chamber, increasing a temperature within the combustion chamber, or both.

Notably, these changes in the gas turbine engine may in turn result in modifications to various relight factors within the gas turbine engine. For example, the change in the composition of the output products may drive an air to fuel ratio/equivalence ratio within the combustion chamber, may affect a temperature within the combustion chamber, may affect a fuel mix (e.g., percentage of hydrogen gas) within the combustion chamber, and may affect a residence time (e.g., total airflow) through the combustion chamber. Similarly, a rotational speed within the gas turbine engine may be affected by varying the fuel cell assembly operating condition at (604), which may similarly drive an air to fuel ratio/equivalence ratio within the combustion chamber. Each of these relight factors may directly impact the ability to relight the combustion chamber following a mid-flight flameout.

More specifically, it will be appreciated that by modifying the fuel cell assembly operating condition, or by modifying multiple fuel cell assembly operating conditions, changes within the combustion chamber may be driven to provide more favorable conditions for relighting the combustion chamber following a mid-flight flameout event. The changes driven may be based on one or more operating conditions of the gas turbine engine and/or aircraft (e.g., altitude, airspeed, ambient temperature, etc.).

For example, referring still to the exemplary aspect of FIG. 9, receiving data indicative of the mid-flight flameout within the combustion section at (602) includes at (606) determining a category of the mid-flight flameout. Determining the category of the mid-flight flameout may include receiving data indicative of a flight speed of the gas turbine engine/aircraft, an altitude of the gas turbine engine/aircraft, a rotational speed of the gas turbine engine, or a combination thereof. Further, with such an exemplary aspect, modifying the fuel cell assembly operating condition at (604) includes at (608) performing a fuel cell modification associated with the category mid-flight flameout.

For example, in at least certain exemplary aspects, the method 600 may determine the category of mid-flight flameout is one of a first category mid-flight flameout, a second category mid-flight flameout, or a third category mid-flight flameout, and in response may perform one of a first fuel cell modification associated with the first category mid-flight flameout, a second fuel cell modification associated with the second category mid-flight flameout, or a third fuel cell modification associated with the third category mid-flight flameout.

More specifically, still, in determining the category of mid-flight flameout at (606), the method 600 may include at (610) determining the mid-flight flameout is a first category mid-flight flameout, and in performing the fuel cell modification at (608), the method 600 may include at (612) performing a first fuel cell modification associated with the first category mid-flight flameout. Further, in determining the category of mid-flight flameout at (606), the method 600 may include at (614) determining the mid-flight flameout is a second category mid-flight flameout, and in performing the fuel cell modification at (608), the method 600 may include at (616) performing a second fuel cell modification associated with the second category mid-flight flameout. Finally, in determining the category of mid-flight flameout at (606), the method 600 may include at (618) determining the mid-flight flameout is a third category mid-flight flameout, and in performing the fuel cell modification at (608), the method 600 may include at (620) performing a third fuel cell modification associated with the third category mid-flight flameout.

In certain exemplary aspects, the first category mid-flight flameout may be a quick relight category, where a quick relight strategy may be used. As will be appreciated, a quick relight usually refers to at a relight that occurs during a take-off or climb condition, where the engine requires thrust and, e.g., hydraulic power to continue to take-off and/or climb. This means the quick relight strategy may employ controls that react relatively quickly to increase the likelihood of a successful relighting of the combustion section within a short window (e.g., within five seconds).

In such a manner, it will be appreciated that the first fuel cell modification may be a modification that can create benefits relatively quickly. For example, with quick relight strategy, the first fuel cell modification may include reducing a current drawn from the fuel cell (to increase $H_2$ within the combustion chamber) or increase a current drawn from the fuel cell (to increase a temperature of the output products provided to the fuel cell and reduce a rotational drag on the rotating components of the engine from other electric machine(s)). Additionally, or alternatively, the quick relight strategy may include activating an ignitor within the combustion section, such as activating a fuel cell ignitor to ignite output products from the fuel cell stack of the fuel cell assembly. Activating the ignitor may include activating the ignitor within five seconds from determining a mid-flight flameout condition.

In certain exemplary aspects, the second category mid-flight flameout may be a windmill start category, where a windmill start strategy may be used. As will be appreciated, a windmill start (also referred to as a "windmill relight" in this context) primarily happens at an elevated altitude during, e.g., cruise. In such a case, there is a relatively long period of time for the engine to respond (as compared to the quick relight). In such a manner, it will be appreciated that the second fuel cell modification may be a modification of the composition of the output products from the fuel cell to increase a fuel to air ratio within the combustion chamber, increase a temperature of the output products provided to the combustion chamber, or both. Such a fuel cell modification may include adjusting a ratio of a flow of reformed fuel to the fuel cell to a flow of air to the fuel cell, decreasing an airflow to and through the fuel cell, increasing a flow of reformed fuel to and through the fuel cell, reducing a current drawn from the fuel cell (to increase $H_2$ within the combustion chamber), increase a current drawn from the fuel cell (to increase a temperature of the output products provided to the fuel cell), increasing a bypass ratio of a flow of reformed fuel around the stack to the combustion section, or a combination thereof.

In certain exemplary aspects, the third category mid-flight flameout may be an assisted start category, where an assisted start strategy may be used. With the assisted start category, the engine may need to be motored in order to facilitate a restart, or in order to increase a probability of a successful relight. Generally, the assisted start strategy may include increasing an electric current drawn from the fuel cell to be able to provide more electric power to an electric starter (e.g., an electric motor/generator) to assist with motoring the engine.

Further, it will be appreciated that within one or more of these categories, or in other categories, it may be desirable to aid in decelerating the gas turbine engine. For example, when descending rapidly following a flameout condition, the core may be rotating too quickly, preventing desired relight conditions (e.g., lean blow out may occur if there is too much speed with a low fuel flow, which may be desired for starting). With such a situation, the airflow to the fuel cell assembly may be increased, and optionally the preburner of the air processing unit may be utilized, to provide higher temperature air to the combustion chamber and increase a fuel to air ratio at the entrance to the combustion chamber.

Further, it will be appreciated that within one or more of these categories, or in other categories, it may be desirable to aid in accelerating the gas turbine engine. In such a situation, it may be desirable to increase a current drawn from the fuel cell, such that a generator rotatable with the gas turbine engine may be offloaded (i.e., less power may need to be drawn therefrom). Such may reduce a drag on the gas turbine engine, such as the core of the gas turbine engine, which may in turn reduce a load for the starter to accelerate the gas turbine engine to the relight envelope. Notably, such may also increase a temperature of the output products provided to the combustion chamber.

Referring still to FIG. 9, the method 600 may further include at (622) modifying a gas turbine engine operating condition separate from the fuel cell assembly operating condition. The gas turbine engine operating condition may include a fuel flowrate to the combustion section, an engine bleed percentage (independent of the airflow provided to the fuel cell assembly), a variable geometry component (e.g., variable inlet guide vanes, variable outlet guide vanes, variable stator vanes, variable outlet nozzles, etc.), or the like. Modifying the gas turbine engine operating condition at (622) may occur prior to, simultaneous with, or subsequent to modifying the fuel cell assembly operating condition at (604).

Further, the method 600 includes at (624) initiating a relight of the combustion section. Initiating the relight of the combustion section at (624) may include initiating the relight of the combustion section subsequent to modifying the fuel cell assembly operating condition at (604). In certain exemplary aspects, initiating the relight of the combustion section at (624) may include initiating the relight of the combustion section with a primary ignitor.

Additionally, for the exemplary aspect depicted, the gas turbine engine includes a fuel cell ignitor. The fuel cell ignitor may be separate from the primary ignitor, or the gas turbine engine may include only the fuel cell ignitor. With such an exemplary aspect, initiating the relight of the combustion section at (624) further includes at (626) activating a fuel cell ignitor within the combustion chamber, and more specifically includes at (628) igniting the output products of the fuel cell within a combustion chamber of the combustion section with an ignitor, such as the fuel cell ignitor. The fuel cell ignitor may be positioned downstream of at least one outlet of the fuel cell to facilitate igniting the output products of the fuel cell within the combustion chamber of the combustion section with the fuel cell ignitor.

Alternatively, the fuel cell ignitor may be positioned in close proximity to an outlet of the fuel cell to facilitate igniting the output products of the fuel cell within the combustion chamber of the combustion section with the ignitor.

It should be appreciated, however, that although the exemplary method 600 described above includes initiating the relight of the combustion section subsequent to modifying the fuel cell assembly operating condition at (604), in other exemplary aspects of the present disclosure, the method 600 may be configured differently. More specifically, as is depicted by a phantom flow line 630 in FIG. 9, in other exemplary aspects of the method 600, initiating the relight of the combustion section at (624) may alternatively include initiating the relight of the combustion section prior to modifying the fuel cell assembly operating condition at (604). With such an exemplary aspect, if the relight initiated at (624) is successful, the method 600 may not include one or more (or all) of the steps associated with step (604) or (622). More specifically, with such an exemplary aspect, initiating the relight of the combustion section at (624) may include maintaining all fuel cell assembly operating conditions substantially constant and also may include maintaining all engine operating conditions substantially constant.

Operation of a propulsion system in accordance with one or more of these exemplary aspects may facilitate an effective widening of a relight envelope following a mid-flight flameout condition. More specifically, the inventors of the present disclosure have discovered that by modifying certain fuel cell assembly operating conditions, relight factors for relighting the combustion chamber may be indirectly affected as well, allowing for use of on-board systems to increase a likelihood of a mid-flight relight, an effectiveness of a mid-flight relight, or both.

Figure 10:
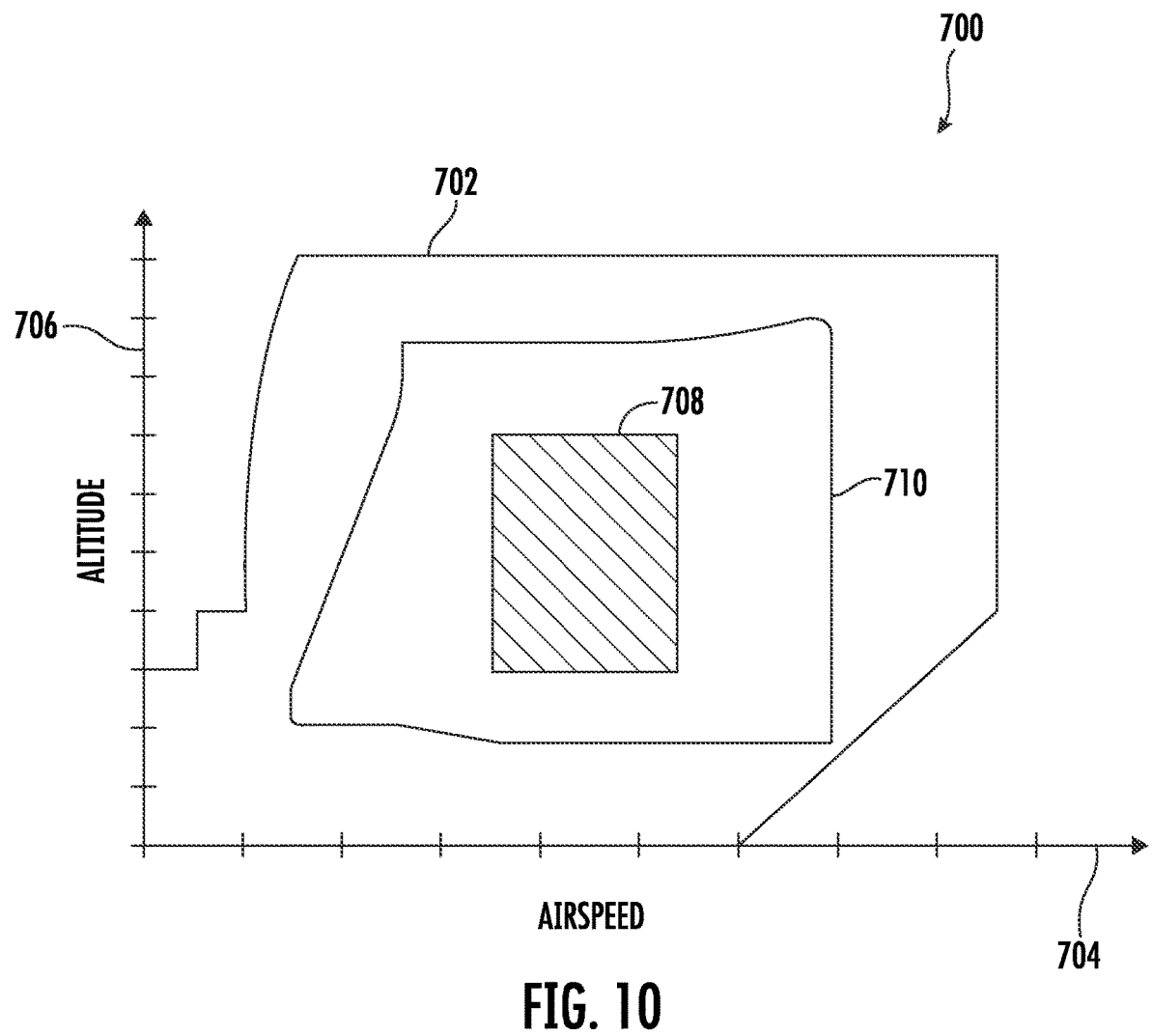
FIG. 10 is a graph depicting a flight plan of an aircraft in accordance with one example aspect of the present disclosure.

For example, referring now briefly to FIG. 10, a graph 700 is provided depicting a flight plan 702 of an aircraft in accordance with one example aspect of the present disclosure. The graph 700 shows the airspeed on an x-axis 704 and the altitude on a y-axis 706. The graph 700 also depicts a baseline relight window 708. The baseline relight window 708 represents generally where the airspeed and altitude parameters need to be to facilitate a relighting of a combustion section of a typical gas turbine engine. Also depicted in the graph 700 is an expanded relight window 710. The expanded relight window 710 represents generally where the airspeed and altitude parameters need to be to facilitate a relighting of a combustion section of a gas turbine engine in accordance with the present disclosure, operated in accordance with one or more example aspects of the present disclosure. As will be appreciated, the relight window may be expanded with the aspects of the disclosure herein.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A propulsion system for an aircraft, the aircraft comprising an aircraft fuel supply, the propulsion system comprising: a fuel cell assembly comprising a fuel cell, the fuel cell defining an outlet positioned to remove output products from the fuel cell and a fuel cell assembly operating condition; a turbomachine comprising a compressor section, a combustion section, and a turbine section arranged in serial flow order, the combustion section configured to receive a flow of aviation fuel from the aircraft fuel supply and further configured to receive the output products from the fuel cell; and a controller comprising memory and one or more processors, the memory storing instructions that when executed by the one or more processors cause the propulsion system to perform operations including receiving data indicative of a mid-flight flameout within the combustion section; modifying the fuel cell assembly operating condition in response to receiving data indicative of the mid-flight flameout within the combustion section; and initiating a relight of the combustion section.

The propulsion system of one or more of these clauses, wherein receiving data indicative of the mid-flight flameout within the combustion section comprises determining the mid-flight flameout is a first category mid-flight flameout, and wherein modifying the fuel cell assembly operating condition comprises performing a first fuel cell modification associated with the first category mid-flight flameout.

The propulsion system of one or more of these clauses, wherein receiving data indicative of the mid-flight flameout within the combustion section further comprises determining the mid-flight flameout is one of a first category mid-flight flameout or a second category mid-flight flameout, and wherein modifying the fuel cell assembly operating condition further comprises performing a first fuel cell modification associated with the first category mid-flight flameout when the first category mid-flight flameout is determined and performing a second fuel cell modification associated with the second category mid-flight flameout when the second category mid-flight flameout is determined.

The propulsion system of one or more of these clauses, wherein the first fuel cell modification is different than the second fuel cell modification.

The propulsion system of one or more of these clauses, wherein modifying the fuel cell assembly operating condition comprises adjusting a fuel cell exhaust condition, including fuel cell assembly output product compositions, fuel cell assembly output product total flowrate, fuel cell assembly output product air/fuel flowrate ratio, fuel cell assembly output product temperature, and fuel cell assembly output product velocity.

The propulsion system of one or more of these clauses, wherein modifying the fuel cell assembly operating condition comprises adjusting a fuel operating condition, wherein adjusting the fuel operating condition comprises adjusting a peak fuel temperature in the fuel processing unit, an exit temperature of the fuel from the fuel processing unit, a fuel temperature downstream of a fuel heat exchanger, a fuel to air ratio in the fuel processing unit, a fuel processing unit gas hourly space velocity (total gas flowrate), or a combination thereof.

The propulsion system of one or more of these clauses, wherein the fuel cell assembly comprises a stack, wherein the stack comprises the fuel cell, and wherein modifying the fuel cell assembly operating condition comprises increasing a bypass ratio of a flow of reformed fuel around the stack to the combustion section.

The propulsion system of one or more of these clauses, wherein modifying the fuel cell assembly operating condition comprises increasing an airflow to the fuel cell from the compressor section.

The propulsion system of one or more of these clauses, wherein modifying the fuel cell assembly operating condition comprises reducing an electrical output of the fuel cell.

The propulsion system of one or more of these clauses, wherein the compressor section comprises a high pressure compressor, wherein the turbine section comprises a high pressure turbine, and wherein the propulsion system further comprises: an electric machine rotatable with the high pressure compressor, the high pressure turbine, or both, and wherein modifying the fuel cell assembly operating condition comprises increasing an electrical power output from the fuel cell and reducing an electrical power output of the electric machine.

The propulsion system of one or more of these clauses, wherein the combustion section comprises a combustor defining a combustion chamber, and wherein modifying the fuel cell assembly operating condition comprises adjusting a fuel to air ratio within the combustion chamber, increasing a temperature within the combustion chamber, or both with the fuel cell assembly.

The propulsion system of one or more of these clauses, wherein adjusting the fuel to air ratio within the combustion chamber, increasing the temperature within the combustion chamber, or both with the fuel cell assembly comprises adjusting a volume percentage of $H_2$ within the combustion chamber.

The propulsion system of one or more of these clauses, wherein the combustion section comprises a combustor defining a combustion chamber, and wherein initiating the relight of the combustion section comprises activating a fuel cell ignitor within the combustion chamber.

A method of operating a propulsion system for an aircraft, the propulsion system comprising a fuel cell assembly comprising a fuel cell, the fuel cell defining an outlet positioned to remove output products from the fuel cell and a turbomachine, the turbomachine comprising a combustion section configured to receive a flow of aviation fuel from an aircraft fuel supply of the aircraft and further configured to receive the output products from the fuel cell, the method comprising: receiving data indicative of a mid-flight flameout within the combustion section; modifying a fuel cell assembly operating condition in response to receiving data indicative of the mid-flight flameout within the combustion section; and initiating a relight of the combustion section.

The method of one or more of these clauses, wherein receiving data indicative of the mid-flight flameout within the combustion section comprises determining the mid-flight flameout is a first category mid-flight flameout, and wherein modifying the fuel cell assembly operating condition comprises performing a first fuel cell modification associated with the first category mid-flight flameout.

The method of one or more of these clauses, wherein receiving data indicative of the mid-flight flameout within the combustion section further comprises determining the mid-flight flameout is one of a first category mid-flight flameout or a second category mid-flight flameout, and wherein modifying the fuel cell assembly operating condition further comprises performing a first fuel cell modification associated with the first category mid-flight flameout when the first category mid-flight flameout is determined and performing a second fuel cell modification associated with the second category mid-flight flameout when the second category mid-flight flameout is determined.

The method of one or more of these clauses, wherein the first fuel cell modification is different than the second fuel cell modification.

A method of operating a propulsion system for an aircraft, the propulsion system comprising a fuel cell defining an outlet positioned to remove output products from the fuel cell and a turbomachine, the turbomachine comprising a combustion section configured to receive a flow of aviation fuel from an aircraft fuel supply of the aircraft and further configured to receive the output products from the fuel cell, the method comprising: receiving data indicative of a mid-flight flameout within the combustion section; and initiating a relight of the combustion section, wherein initiating the relight of the combustion section comprises igniting the output products of the fuel cell within a combustion chamber of the combustion section with an ignitor.

The method of one or more of these clauses, wherein the ignitor is a dedicated fuel cell ignitor.

The method of one or more of these clauses, wherein the ignitor is positioned downstream of at least a portion of the fuel cell.

We claim:

1. A propulsion system for an aircraft, the aircraft comprising an aircraft fuel supply, the propulsion system comprising:
    a fuel cell assembly comprising a fuel cell, the fuel cell defining an outlet positioned to remove output products from the fuel cell and a fuel cell assembly operating condition, wherein the fuel cell assembly further includes a dedicated fuel cell ignitor;
    a turbomachine comprising a compressor section, a combustion section, and a turbine section arranged in serial flow order, the combustion section configured to receive a flow of aviation fuel from the aircraft fuel supply and further configured to receive the output products from the fuel cell, the combustion section including a dome assembly, a combustion chamber, and a primary ignitor disposed downstream from the dome assembly, wherein the primary ignitor is disposed upstream from the dedicated fuel cell ignitor; and
    a controller comprising memory and one or more processors, the memory storing instructions that when executed by the one or more processors cause the propulsion system to perform operations including,
    receiving data indicative of a mid-flight flameout within the combustion section;
    modifying the fuel cell assembly operating condition in response to receiving data indicative of the mid-flight flameout within the combustion section; and
    initiating a relight of the combustion section, wherein initiating the relight of the combustion section comprises activating the dedicated fuel cell ignitor within the combustion chamber.

2. The propulsion system of claim 1, wherein receiving data indicative of the mid-flight flameout within the combustion section comprises determining the mid-flight flameout is a first category mid-flight flameout, and wherein modifying the fuel cell assembly operating condition in response to receiving data indicative of the mid-flight flameout within the combustion section comprises performing a first fuel cell modification associated with the first category mid-flight flameout.

3. The propulsion system of claim 1, wherein receiving data indicative of the mid-flight flameout within the combustion section further comprises determining the mid-flight flameout is one of a first category mid-flight flameout or a second category mid-flight flameout, and wherein modifying the fuel cell assembly operating condition in response to receiving data indicative of the mid-flight flameout within the combustion section further comprises performing a first fuel cell modification associated with the first category mid-flight flameout when the first category mid-flight flameout is determined, and performing a second fuel cell modification associated with the second category mid-flight flameout when the second category mid-flight flameout is determined.

4. The propulsion system of claim 3, wherein the first fuel cell modification is different than the second fuel cell modification.

5. The propulsion system of claim 1, wherein modifying the fuel cell assembly operating condition in response to receiving data indicative of the mid-flight flameout within the combustion section comprises adjusting a fuel cell exhaust condition, wherein the fuel cell exhaust condition comprises one or more of a fuel cell assembly output product composition, a fuel cell assembly output product total flowrate, a fuel cell assembly output product air/fuel flowrate ratio, a fuel cell assembly output product temperature, and a fuel cell assembly output product velocity.

6. The propulsion system of claim 1, wherein modifying the fuel cell assembly operating condition in response to receiving data indicative of the mid-flight flameout within the combustion section comprises adjusting a fuel operating condition, wherein adjusting the fuel operating condition comprises adjusting at least one of a peak fuel temperature in the fuel processing unit, an exit temperature of the fuel from the fuel processing unit, a fuel temperature downstream of a fuel heat exchanger, a fuel to air ratio in the fuel processing unit, or a fuel processing unit gas hourly space velocity (total gas flowrate).

7. The propulsion system of claim 1, wherein the fuel cell assembly comprises a stack, wherein the stack comprises the fuel cell, and wherein modifying the fuel cell assembly operating condition in response to receiving data indicative of the mid-flight flameout within the combustion section comprises increasing a bypass ratio of a flow of reformed fuel around the stack to the combustion section.

8. The propulsion system of claim 1, wherein modifying the fuel cell assembly operating condition in response to receiving data indicative of the mid-flight flameout within the combustion section comprises increasing an airflow to the fuel cell from the compressor section.

9. The propulsion system of claim 1, wherein modifying the fuel cell assembly operating condition in response to receiving data indicative of the mid-flight flameout within the combustion section comprises reducing an electrical output of the fuel cell.

10. The propulsion system of claim 1, wherein the compressor section comprises a high pressure compressor, wherein the turbine section comprises a high pressure turbine, and wherein the propulsion system further comprises:
an electric machine rotatable with the high pressure compressor, the high pressure turbine, or both, and wherein modifying the fuel cell assembly operating condition in response to receiving data indicative of the mid-flight flameout within the combustion section comprises increasing an electrical power output from the fuel cell and reducing an electrical power output of the electric machine.

11. The propulsion system of claim 1, wherein the combustion section comprises a combustor defining a combustion chamber, and wherein modifying the fuel cell assembly operating condition in response to receiving data indicative of the mid-flight flameout within the combustion section comprises adjusting a fuel to air ratio within the combustion chamber, increasing a temperature within the combustion chamber, or both with the fuel cell assembly.

12. The propulsion system of claim 11, wherein adjusting the fuel to air ratio within the combustion chamber, increasing the temperature within the combustion chamber, or both with the fuel cell assembly comprises adjusting a volume percentage of H2 within the combustion chamber.

13. A method of operating a propulsion system for an aircraft, the propulsion system comprising a fuel cell assembly comprising a fuel cell, the fuel cell defining an outlet positioned to remove output products from the fuel cell, wherein the fuel cell assembly further includes a dedicated fuel cell ignitor, the propulsion system further comprising a turbomachine, the turbomachine comprising a combustion section including a dome assembly, a combustion chamber, and a primary ignitor disposed downstream from the dome assembly, wherein the primary ignitor is disposed upstream from the dedicated fuel cell ignitor, wherein the combustion chamber is configured to receive a flow of aviation fuel via the dome assembly from an aircraft fuel supply of the aircraft and further configured to receive the output products from the fuel cell, the method comprising:
receiving data indicative of a mid-flight flameout within the combustion section;
modifying a fuel cell assembly operating condition in response to receiving data indicative of the mid-flight flameout within the combustion section; and
initiating a relight of the combustion section, wherein initiating the relight of the combustion section comprises activating the dedicated fuel cell ignitor within the combustion chamber.

14. The method of claim 13, wherein receiving data indicative of the mid-flight flameout within the combustion section comprises determining the mid-flight flameout is a first category mid-flight flameout, and wherein modifying the fuel cell assembly operating condition in response to receiving data indicative of the mid-flight flameout within the combustion section comprises performing a first fuel cell modification associated with the first category mid-flight flameout.

15. The method of claim 13, wherein receiving data indicative of the mid-flight flameout within the combustion section further comprises determining the mid-flight flameout is one of a first category mid-flight flameout or a second category mid-flight flameout, and wherein modifying the fuel cell assembly operating condition in response to receiving data indicative of the mid-flight flameout within the combustion section further comprises performing a first fuel cell modification associated with the first category mid-flight flameout when the first category mid-flight flameout is determined and performing a second fuel cell modification associated with the second category mid-flight flameout when the second category mid-flight flameout is determined.

16. The method of claim 15, wherein the first fuel cell modification is different than the second fuel cell modification.

* * * * *